US012682159B2

(12) United States Patent
Kotikalapudi et al.

(10) Patent No.: US 12,682,159 B2
(45) Date of Patent: Jul. 14, 2026

(54) INSTRUCTION FOLLOWING IN LARGE LANGUAGE MODELS TO REDUCE COMPUTATIONAL RESOURCE CONSUMPTION

(71) Applicant: GOOGLE LLC, Mountain View, CA (US)

(72) Inventors: Ragha Kotikalapudi, San Jose, CA (US); Swaroop Mishra, Mountain View, CA (US); Sahitya Potluri, Sunnyvale, CA (US); Taylor Bos, Santa Clara, CA (US); Yu Du, Sunnyvale, CA (US); Chen Zhu, Palo Alto, CA (US); Steven Zheng, San Bruno, CA (US); Hanzhao Lin, Cupertino, CA (US); Summer Yue, San Francisco, CA (US); Heng-Tze Cheng, Mountain View, CA (US); Quoc Le, Sunnyvale, CA (US); Ed H. Chi, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 18/231,586

(22) Filed: Aug. 8, 2023

(65) Prior Publication Data

US 2024/0394471 A1 Nov. 28, 2024

Related U.S. Application Data

(60) Provisional application No. 63/469,276, filed on May 26, 2023.

(51) Int. Cl.
*G06F 40/20* (2020.01)
(52) U.S. Cl.
CPC .................................... *G06F 40/20* (2020.01)

(58) Field of Classification Search
CPC ..................................................... G06F 40/20
See application file for complete search history.

(56) References Cited

U.S. PATENT DOCUMENTS

| | | | |
|---|---|---|---|
| 2023/0074406 A1 | 3/2023 | Baeuml | |
| 2024/0062006 A1* | 2/2024 | Li | G06F 40/30 |

(Continued)

OTHER PUBLICATIONS

Madaan et al. ("Self-refine: Iterative refinement with self-feedback." Advances in Neural Information Processing Systems 36 (2023): 46534-46594. https://arxiv.org/abs/2303.17651. [Submitted on Mar. 30, 2023 (v1), last revised May 25, 2023 (this version, v2)]). (Year: 2023).*

(Continued)

*Primary Examiner* — Pierre Louis Desir
*Assistant Examiner* — Keisha Y. Castillo-Torres
(74) *Attorney, Agent, or Firm* — Gray Ice Higdon

(57) ABSTRACT

Implementations relate to improving instruction following capabilities of large language models (LLMs) using instruction decomposition, self-evaluation, and optionally progressive refinement. Processor(s) of a system can: obtain natural language (NL) based input, generate a plurality of candidate responses and evaluate the candidate responses based on instructions included in the NL based input, using an LLM, and progressively refine the candidate responses until it is determined that one or more termination criteria are satisfied. In some implementations, the NL based input can be received from a client device. In these implementations, a given candidate response that is progressively refined can be rendered for presentation at the client device and responsive to the NL base input. In additional or alternative implementations, the NL based input can be obtained from database (s). In these implementations, a given candidate response that is progressively refined can be utilized in fine-tuning of the LLM.

20 Claims, 15 Drawing Sheets

(56)                    References Cited

U.S. PATENT DOCUMENTS

| | | | |
|---|---|---|---|
| 2025/0028900 A1* | 1/2025 | Townsend | G06F 40/20 |
| 2025/0156634 A1* | 5/2025 | Klafter | G06F 16/953 |

OTHER PUBLICATIONS

Bowman, S.R. et al., "Measuring Progress on Scalable Oversight for Large Language Models"; Cornell University, arXiv.org; arXiv:2211.03540v2; 21 pages; dated Nov. 11, 2022.

Wang, Y. et al., "Self-Instruct: Aligning Language Models with Self-Generated Instructions"; Cornell University; arXiv.org; arXiv:2212.10560v2; 23 pages; dated May 25, 2023.

Madaan, A. et al., "Self-Refine: Iterative Refinement with Self-Feedback"; arXiv.org, Cornell University; arXiv:2303.17651v2; 54 pages; dated May 25, 2023.

Pan, et al., "Automatically Correcting Large Language Models: Surveying the landscape of diverse self-correction strategies"; arXiv.org, Cornell University; arXiv:2308.03188v1; 23 pages Aug. 3, 2023.

European Patent Office; International Search Report and Written Opinion issued in Application No. PCT/US2023/034924; 20 pages; dated Feb. 6, 2023.

European Patent Office; Search Report issued in Application No. 23798580.9, 12 pages, dated Nov. 14, 2025.

* cited by examiner

200A

200B

A

TERMINATION CRITERIA SATISFIED? 240

YES

NO

SELECT NEXT NODE 245

CANDIDATE RESPONSE 222

CRITIQUE RESPONSE 232

RESPONSE REVISION ENGINE 161

REFINED CANDIDATE RESPONSES 260

INSTRUCTIONS 212

CRITIQUE RESPONSE GENERATION ENGINE 152

CRITIQUE RESPONSES 234

SELECTED CANDIDATE RESPONSE 224

B

200C

400B

NL BASED INPUT 410

FIRST SET OF INSTRUCTIONS 412

RESPONSE 420

CRITIQUE RESPONSE GENERATION ENGINE 152

CRITIQUE RESPONSE 430

RESPONSE MODIFICATION ENGINE 172

MODIFIED RESPONSE 422

TRAINING INSTANCE(S) 132A

FINE-TUNING LLM 470

600A

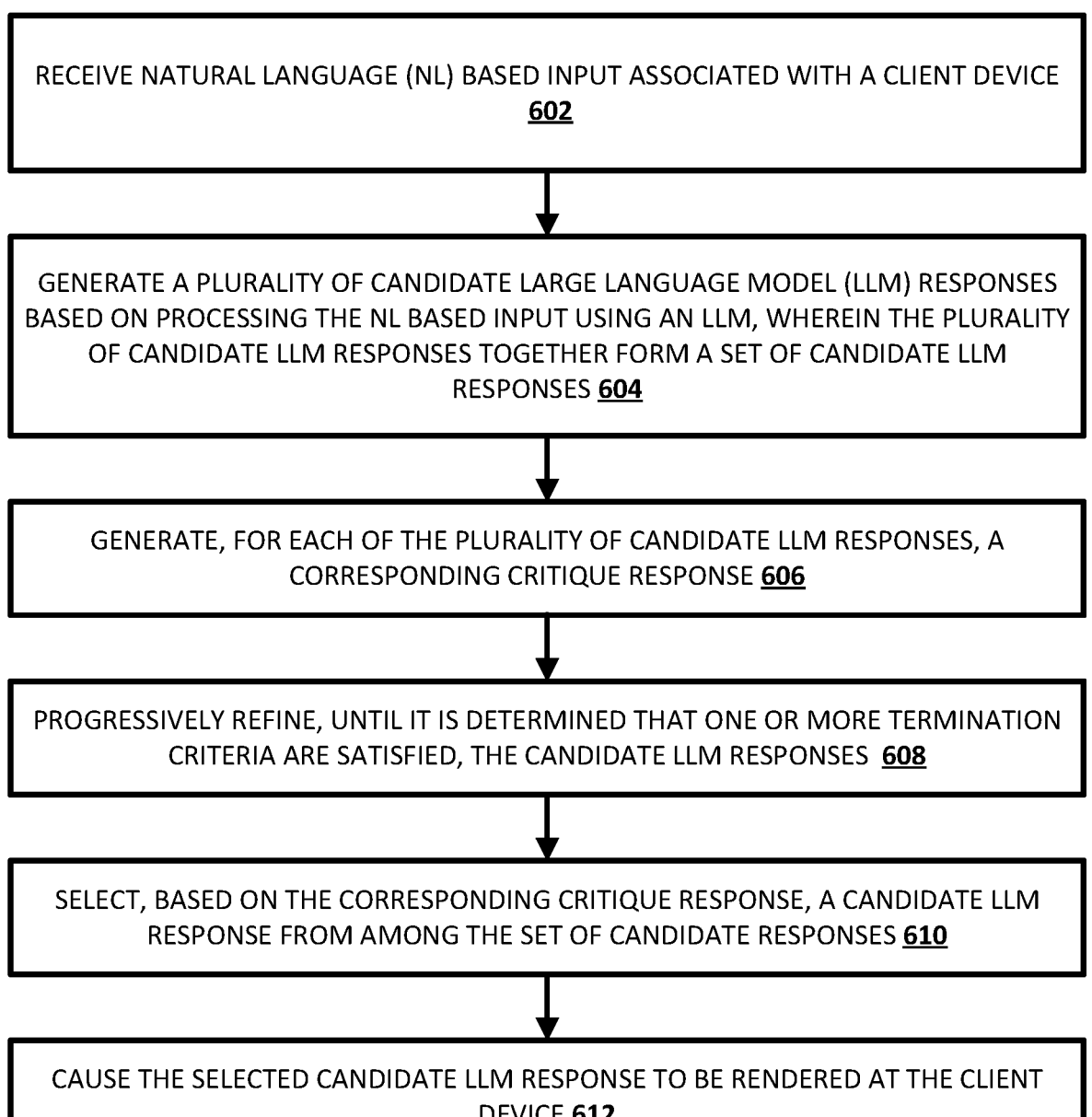

RECEIVE NATURAL LANGUAGE (NL) BASED INPUT ASSOCIATED WITH A CLIENT DEVICE
602

GENERATE A PLURALITY OF CANDIDATE LARGE LANGUAGE MODEL (LLM) RESPONSES BASED ON PROCESSING THE NL BASED INPUT USING AN LLM, WHEREIN THE PLURALITY OF CANDIDATE LLM RESPONSES TOGETHER FORM A SET OF CANDIDATE LLM RESPONSES 604

GENERATE, FOR EACH OF THE PLURALITY OF CANDIDATE LLM RESPONSES, A CORRESPONDING CRITIQUE RESPONSE 606

PROGRESSIVELY REFINE, UNTIL IT IS DETERMINED THAT ONE OR MORE TERMINATION CRITERIA ARE SATISFIED, THE CANDIDATE LLM RESPONSES 608

SELECT, BASED ON THE CORRESPONDING CRITIQUE RESPONSE, A CANDIDATE LLM RESPONSE FROM AMONG THE SET OF CANDIDATE RESPONSES 610

CAUSE THE SELECTED CANDIDATE LLM RESPONSE TO BE RENDERED AT THE CLIENT DEVICE 612

FIG. 6A

600B

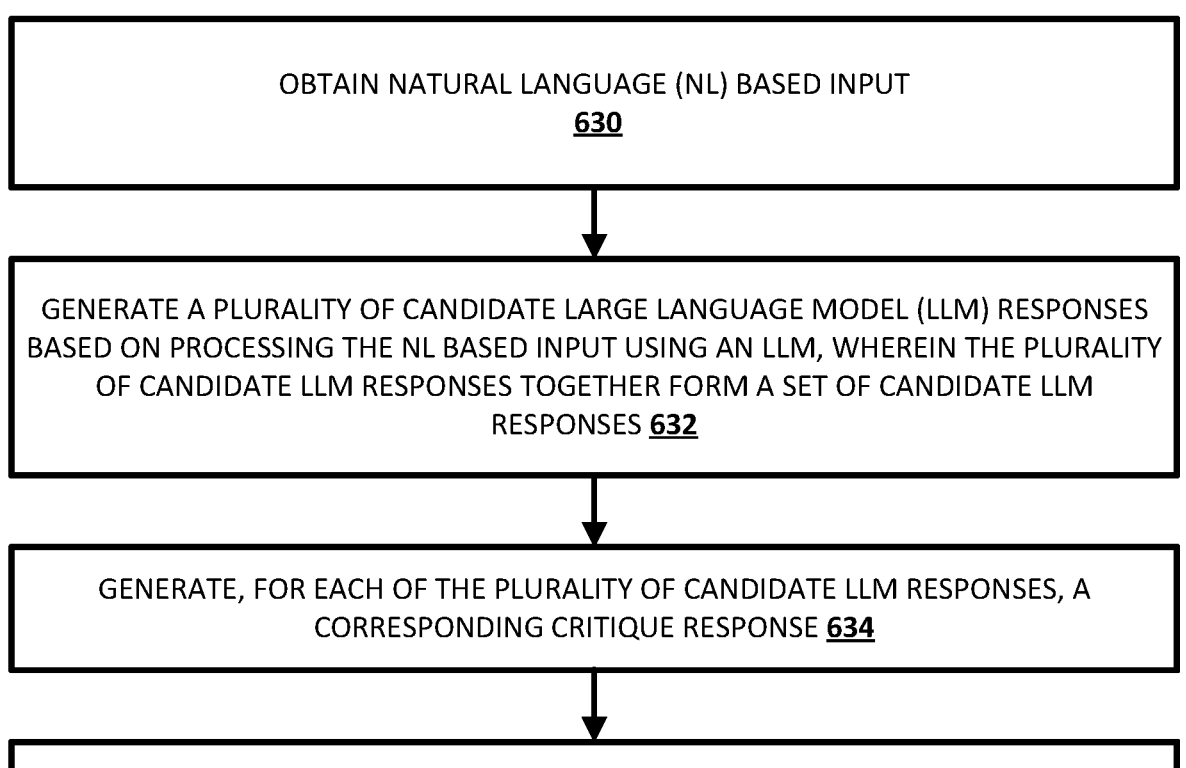

OBTAIN NATURAL LANGUAGE (NL) BASED INPUT
630

GENERATE A PLURALITY OF CANDIDATE LARGE LANGUAGE MODEL (LLM) RESPONSES BASED ON PROCESSING THE NL BASED INPUT USING AN LLM, WHEREIN THE PLURALITY OF CANDIDATE LLM RESPONSES TOGETHER FORM A SET OF CANDIDATE LLM RESPONSES 632

GENERATE, FOR EACH OF THE PLURALITY OF CANDIDATE LLM RESPONSES, A CORRESPONDING CRITIQUE RESPONSE 634

PROGRESSIVELY REFINE, UNTIL IT IS DETERMINED THAT ONE OR MORE TERMINATION CRITERIA ARE SATISFIED, THE CANDIDATE LLM RESPONSES  636

SELECT, BASED ON THE CORRESPONDING CRITIQUE RESPONSE, A CANDIDATE LLM RESPONSE FROM AMONG THE SET OF CANDIDATE RESPONSES 638

STORING, AS AN INSTANCE OF TRAINING DATA FOR FINE-TUNING THE LARGE LANGUAGE MODEL (LLM), THE NL BASED INPUT ALONG WITH THE SELECTED CANDIDATE LLM RESPONSE 640

FIG. 6B

700A

```
┌─────────────────────────────────────────────────────────────────────────┐
│               OBTAIN NATURAL LANGUAGE (NL) BASED INPUT                    │
│                                  702                                      │
└─────────────────────────────────────────────────────────────────────────┘
```

```
┌─────────────────────────────────────────────────────────────────────────┐
│  OBTAIN A LARGE LANGUAGE MODEL (LLM) RESPONSE WHICH HAS BEEN GENERATED    │
│      BASED ON PROCESSING THE NL BASED INPUT USING AN LLM 704              │
└─────────────────────────────────────────────────────────────────────────┘
```

```
┌─────────────────────────────────────────────────────────────────────────┐
│  GENERATE A CRITIQUE RESPONSE FOR THE LLM RESPONSE, THE CRITIQUE RESPONSE │
│ FOR THE LLM RESPONSE BEING GENERATED BASED ON PROCESSING THE LLM RESPONSE │
│                         USING THE LLM 706                                 │
└─────────────────────────────────────────────────────────────────────────┘
```

```
┌─────────────────────────────────────────────────────────────────────────┐
│  MODIFY THE NL BASED INPUT SUCH THAT THE MODIFIED NL BASED INPUT INCLUDES A│
│  SECOND SET OF INSTRUCTIONS, WHEREIN THE LLM RESPONSE DOES COMPLY WITH    │
│      EACH INSTRUCTION IN THE SECOND SET OF INSTRUCTIONS 708               │
└─────────────────────────────────────────────────────────────────────────┘
```

```
┌─────────────────────────────────────────────────────────────────────────┐
│  STORE THE MODIFIED NL BASED INPUT AND THE LLM RESPONSE AS AN INSTANCE OF │
│                         TRAINING DATA 710                                 │
└─────────────────────────────────────────────────────────────────────────┘
```

FIG. 7A

700B

```
┌─────────────────────────────────────────────────────────────────┐
│              OBTAIN NATURAL LANGUAGE (NL) BASED INPUT             │
│                              720                                 │
└─────────────────────────────────────────────────────────────────┘
                                │
                                ▼
┌─────────────────────────────────────────────────────────────────┐
│  OBTAIN A LARGE LANGUAGE MODEL (LLM) RESPONSE WHICH HAS BEEN     │
│  GENERATED BASED ON PROCESSING THE NL BASED INPUT USING AN LLM   │
│                              722                                 │
└─────────────────────────────────────────────────────────────────┘
                                │
                                ▼
┌─────────────────────────────────────────────────────────────────┐
│  GENERATE A CRITIQUE RESPONSE FOR THE LLM RESPONSE, THE CRITIQUE │
│  RESPONSE FOR THE LLM RESPONSE BEING GENERATED BASED ON          │
│  PROCESSING THE LLM RESPONSE USING THE LLM 724                   │
└─────────────────────────────────────────────────────────────────┘
                                │
                                ▼
┌─────────────────────────────────────────────────────────────────┐
│  MODIFY THE LLM RESPONSE SUCH THAT THE MODIFIED LLM RESPONSE     │
│  COMPLIES WITH THE AT LEAST ONE INSTRUCTION 726                  │
└─────────────────────────────────────────────────────────────────┘
                                │
                                ▼
┌─────────────────────────────────────────────────────────────────┐
│  STORE THE NL BASED INPUT AND THE MODIFIED LLM RESPONSE AS AN    │
│  INSTANCE OF TRAINING DATA 728                                   │
└─────────────────────────────────────────────────────────────────┘
```

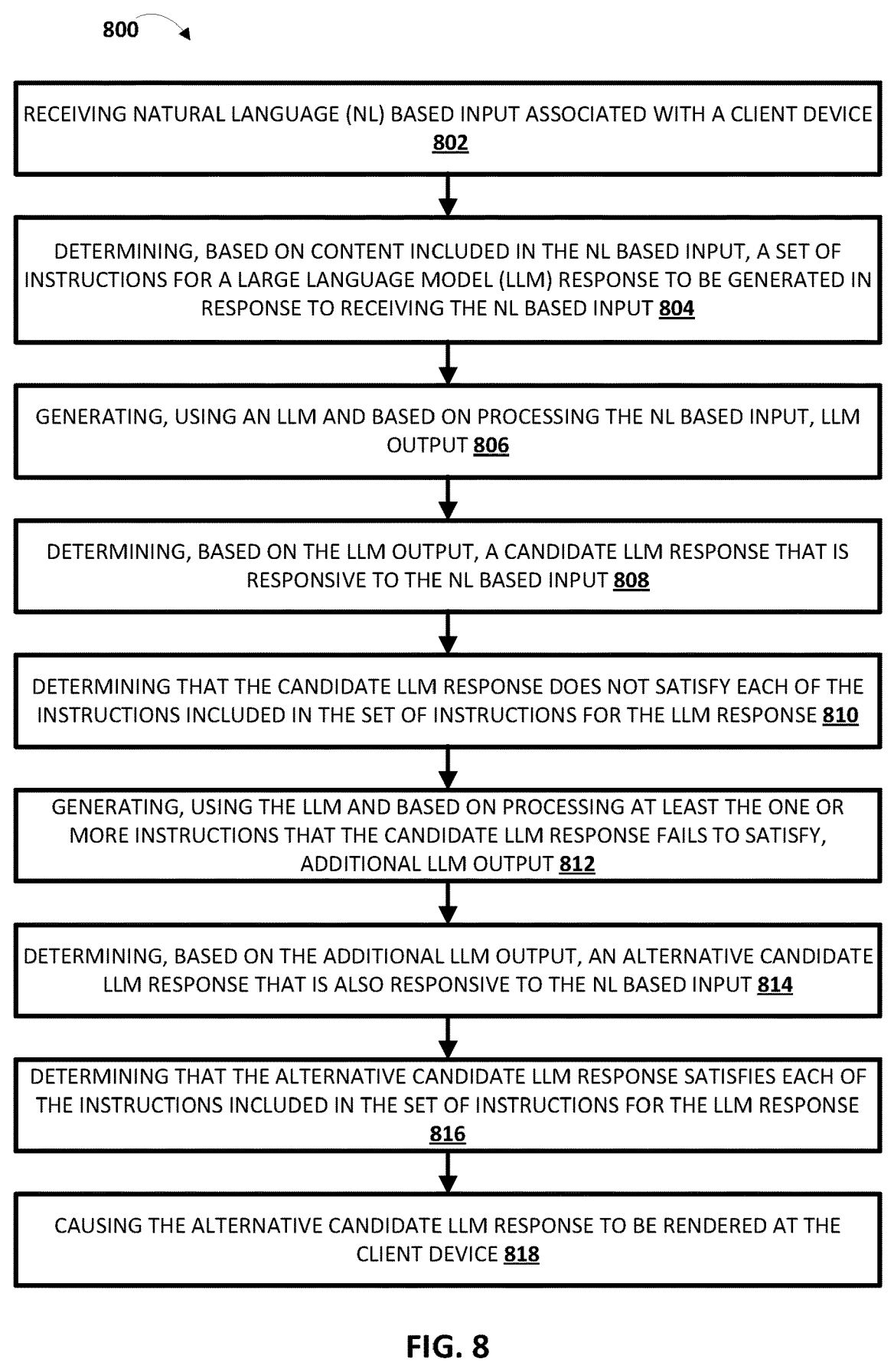

RECEIVING NATURAL LANGUAGE (NL) BASED INPUT ASSOCIATED WITH A CLIENT DEVICE
802

DETERMINING, BASED ON CONTENT INCLUDED IN THE NL BASED INPUT, A SET OF INSTRUCTIONS FOR A LARGE LANGUAGE MODEL (LLM) RESPONSE TO BE GENERATED IN RESPONSE TO RECEIVING THE NL BASED INPUT 804

GENERATING, USING AN LLM AND BASED ON PROCESSING THE NL BASED INPUT, LLM OUTPUT 806

DETERMINING, BASED ON THE LLM OUTPUT, A CANDIDATE LLM RESPONSE THAT IS RESPONSIVE TO THE NL BASED INPUT 808

DETERMINING THAT THE CANDIDATE LLM RESPONSE DOES NOT SATISFY EACH OF THE INSTRUCTIONS INCLUDED IN THE SET OF INSTRUCTIONS FOR THE LLM RESPONSE 810

GENERATING, USING THE LLM AND BASED ON PROCESSING AT LEAST THE ONE OR MORE INSTRUCTIONS THAT THE CANDIDATE LLM RESPONSE FAILS TO SATISFY, ADDITIONAL LLM OUTPUT 812

DETERMINING, BASED ON THE ADDITIONAL LLM OUTPUT, AN ALTERNATIVE CANDIDATE LLM RESPONSE THAT IS ALSO RESPONSIVE TO THE NL BASED INPUT 814

DETERMINING THAT THE ALTERNATIVE CANDIDATE LLM RESPONSE SATISFIES EACH OF THE INSTRUCTIONS INCLUDED IN THE SET OF INSTRUCTIONS FOR THE LLM RESPONSE 816

CAUSING THE ALTERNATIVE CANDIDATE LLM RESPONSE TO BE RENDERED AT THE CLIENT DEVICE 818

FIG. 8

INSTRUCTION FOLLOWING IN LARGE LANGUAGE MODELS TO REDUCE COMPUTATIONAL RESOURCE CONSUMPTION

BACKGROUND

Large language models (LLMs) are particular types of machine learning models that can perform various natural language processing (NLP) tasks, such as language generation, machine translation, and question-answering. These LLMs are typically trained on enormous amounts of diverse data including data from, but not limited to, webpages, electronic books, software code, electronic news articles, and machine translation data. Accordingly, these LLMs leverage the underlying data on which they were trained in performing these various NLP tasks. For instance, in performing a language generation task, these LLMs can process a natural language (NL) based input that is received from a client device, and generate an NL based output that is responsive to the NL based input and that is to be rendered at the client device.

In some cases, an LLM can include hundreds of millions of parameters, billions of parameters, or even one hundred billion or more parameters. As such, given the large numbers of parameters included in an LLM, performance of NLP tasks using an LLM can consume relatively large amounts of resources (e.g., in terms of computing resources used in completing the NLP task, time taken to complete performance of the NLP task, energy consumed for completion of the NLP task, etc.). Furthermore, again owing to the size of LLMs, it can be difficult to adequately train an LLM such that it can reliably perform a given NLP task according to that task's respective constraints since the LLMs can be prone to hallucinations (e.g., generate responses to the NL based input that are factually inaccurate and/or nonsensical). It is therefore beneficial in terms of computational resource usage for LLMs to generate responses to NL based inputs that do not necessitate additional follow-up NL based inputs due to initially generating responses that include hallucinations.

SUMMARY

Implementations described herein can serve to reduce the number of follow-up NL based inputs that may be received by an LLM by mitigating and/or eliminating instances of the LLM hallucinating. Although any given user may decide to provide a follow-up NL based input, any "on average" reduction in the number of follow-up NL based inputs can be hugely beneficial in terms of computational resource usage. More specifically, some implementations described herein relate to using self-evaluation when utilizing a LLM to generate a response to a NL based input. Some of these implementations described herein relate to using a progressive refining process in concert with self-evaluation when utilizing an LLM to generate a response to a NL based input. Some additional or alternative implementations described herein relate to using self-evaluation to identify NL based inputs which cannot be adequately responded to using an LLM.

For instance, in some implementations, an LLM can be used to process an NL based input to generate a plurality of responses, and to generate a critique of those responses by comparing the responses to instructions included in the NL based response. For instance, the NL based input can request that the LLM generate a response that includes 6 lines and in the style of a particular writer. As such, the LLM can be used to generate a number of responses and determine whether each of the responses follows each of these instructions (e.g., based on determining the number of lines in the response, and based determining whether the response is in the style of the particular writer). A response can thus be considered to be "high quality" if it is determined that the response follows all (or at least above a certain threshold number) of the instructions in the NL based input. For instance, it can be assumed that a likelihood of a given response resulting in follow-up NL based input(s) corresponds to the extent to which the response complies with the set instructions included in the NL based input. The plurality of responses can then be progressively refined until it is determined that a response is generated which follows all (or at least a threshold number) of the instructions included in the NL based response. Such techniques can result in responses being provided that reduce the number of follow-up NL based inputs, at least on average across the user base.

The progressive refinement can be a repetitive (or in other words iterative, or cyclical) process whereby, at each iteration, a candidate response generated thus far is chosen to be refined, and each of the refined responses are added to the "pool" of candidate responses. In some implementations, the most promising (e.g., the highest quality) candidate response is chosen to be refined.

Since the LLM operates in a probabilistic manner, the quality of the initial, candidate, responses generated based on processing the NL based input using the LLM can vary. For instance, if an average of the quality of the candidate responses is taken, some of the candidate responses can be considered below the average quality and some can be considered above the average quality. By evaluating the quality of the candidate responses based on comparing them against the instructions included in the NL based input, the candidate response that is considered the highest quality can be identified. This can then be used, for instance, to determine the most promising candidate response to refine. As such, at each iteration for the progressive refinement, the likelihood for generating a response with a higher quality than the responses generated thus far can be increased.

In some implementations, the self-evaluation process and the progressive refinement process described herein can be used during utilization of an NL based response system including an LLM to generate a response to an NL based input associated with (e.g., provided by) a user via a client device. In this way, the likelihood of generating a response which follows all (or at least a threshold number) of the instructions in the NL based input provided by the user to be rendered at the client device can be improved.

In some additional or alternative implementations, the self-evaluation process and progressive refinement process described herein can be used to generate synthetic training data for fine-tuning an LLM for subsequent utilization by, for example, an NL based response system. For instance, an NL based input can be obtained (for instance, from a database of previously submitted NL based inputs provided by one or more users), and provided as input to the NL based response system. The NL based response system can provide, as output, a high quality response by utilizing the self-evaluation process and progressive refinement described herein. The NL based input and the high quality response can then be stored as a training instance to be used for fine-tuning the LLM. In some implementations, another of the candidate responses can also be stored as an example of a "low quality" response, and the fine-tuning can be based on both the "high quality" response and the "low quality" response.

In some additional or alternative implementations still, the self-evaluation process described herein can be used to identify "hard" NL based inputs (e.g., from the database of previously submitted NL based inputs provided by one or more users). In this context, a "hard" NL based input can be defined as an NL based input for which an LLM (e.g., prior to fine-tuning) has a low likelihood of generating a high quality response (e.g., by violating one or more of the instructions present in the NL based input). Since, in general, the performance of an LLM (e.g., the LLM's instruction following ability) can be expected to improve by being fine-tuned (or trained) based on "hard" NL based inputs, it is beneficial to identify and provide "hard" NL based inputs along with corresponding "high quality" examples of responses to those inputs. As such, once the "hard" NL based inputs have been identified, implementations described herein relate to generating training data based on the identified NL based inputs. For instance, in some implementations, corresponding high quality responses can be generated using the progressive refinement process described herein. In some additional or alternative implementations, either the identified NL based input or a corresponding response (which can be generated or also retrieved from a database) can be modified such that the resulting NL based input and response correspond.

By fine-tuning the LLM based on examples of "high quality" responses (especially for "hard" NL based inputs), the average quality of responses generated using the fine-tuned LLM can be of a higher quality than corresponding responses generated using the LLM prior to fine-tuning. This process can be repeated, such that at each iteration, the average quality of response generated using the LLM is improved.

In these and other manners, responses generated using an LLM can be reliably of a higher quality. This can be the case whether the self-evaluation process (and optionally progressive refinement process) described herein is used when the response is generated or is used to generate training data used in fine-tuning the LLM prior to the response being generated. As such, instances of subsequent (e.g., follow-up) NL based inputs provided by a user, e.g. in order to improve the quality of an initial response, which would otherwise be processed by the LLM can be reduced. For instance, if an initial response did not comply with an instruction from the initial NL based input, the user may provide a further NL based input which explicitly requests that that instruction be followed in an effort to force the LLM to generate a response which complies with the instruction. The user may repeat this process a number of times, for instance, if the subsequent responses do not adequately comply with the instruction, or if there are further instructions which the response does not comply with. As described herein, implementations which utilize the self-evaluation process (and optionally the progressive refinement process) can ensure that resources, which would otherwise be consumed in these repeated interactions with the LLM, can be conserved.

Furthermore, as described herein, a mechanism for self-evaluation for responses generated using an LLM is provided. In this way, the responses, and the corresponding NL based input, can be stored as training data, with the self-evaluation process providing a manner of labelling the training data without human intervention and/or with minimal human intervention that is guided by the self-evaluation process. Furthermore, the progressive refinement process can be used to ensure that high quality examples can be included in the training data. As such, implementations described herein can provide a relatively low cost and time efficient manner of labelling training data as compared to, for instance, manually labelling training data by humans (e.g. manually indicating a relative or absolute quality of responses generated using an LLM).

In addition, in some instances, the self-evaluation process and progressive refinement process can be used as part of an NL based response system to be used for conducting a dialog (e.g., including multiple inputs and responses) with a human user. For instance, the NL based response system can be provided as part of a dialog with an automated assistant, a chat bot, etc. In some cases, the user can provide one or more commands to be fulfilled as part of the dialog (e.g., to control a smart device, to generate code, to generate commands to control a robot, to assist with navigation in a vehicle, etc.). As such, use of the processes described herein can also assist the user in performing a technical task by means of a continued and guided human-machine interaction process. Further, and since the responses generated using the LLM can be reliably of a higher quality, the human-machine interaction process can be concluded in a quick and efficient manner.

Furthermore, implementations described herein can allow a user to more easily and intuitively interact and control the NL based response system, which is itself a technical system. For instance, since the NL based response system can be capable of evaluating and refining responses itself, it is not necessary for the user to explicitly provide further NL based inputs to perform these processes. As discussed herein, determining the content of such further NL based inputs by a human can require trial and error, or can require high levels of skill, training, and/or familiarity with the particular LLM. As such, implementations described herein can mitigate these obstacles.

In other words, implementations described herein can provide a mechanism by which, without any additional interaction from the user, the instructions included in the NL based input can effectively be leveraged when processing the NL based input by the LLM to generate a higher quality response, and therefore provide more efficient access to the information stored in the LLM. This has the effect of augmenting the NL based input (e.g., using the structured requests described herein to conduct the described processes) to the LLM, and thus improving the information retrieval by the LLM on an objective basis.

As mentioned, an LLM is typically trained with data from, for instance, webpages, electronic books, software code, electronic news articles, and machine translation data, and, when, for instance, generating a response to a particular NL based input, the LLM leverages information distilled from the underlying data on which it was trained. In this way, an LLM can be considered to be a database structure with information stored in the parameters of the LLM. Since, as described herein, an NL based input to be processed by the LLM can be augmented by using the processes described herein, this can be considered to be an improved database query, which can result in more efficient information retrieval.

The above description is provided as an overview of some implementations of the present disclosure. Further description of those implementations, and other implementations, are described in more detail below.

BRIEF DESCRIPTION OF THE DRAWINGS

FIG. 6A depicts a flowchart illustrating an example method of utilizing an NL based response system to generate a response to an NL based input associated with a client device, in accordance with various implementations.

FIG. 6B depicts a flowchart illustrating an example method of generating training instances by utilizing an NL based response system to generate a response to an NL based input, in accordance with various implementations.

FIG. 7A depicts a flowchart illustrating an example method of generating training instances by modifying an NL based input for an NL based response system, in accordance with various implementations.

FIG. 7B depicts a flowchart illustrating an example method of generating training instances by modifying a response to an NL based input generated by an NL based response system, in accordance with various implementations.

FIG. 8 depicts a flowchart illustrating an example method of utilizing an NL based response system to generate a response to an NL based input associated with a client device, in accordance with various implementations.

DETAILED DESCRIPTION OF THE DRAWINGS

Figure 1:
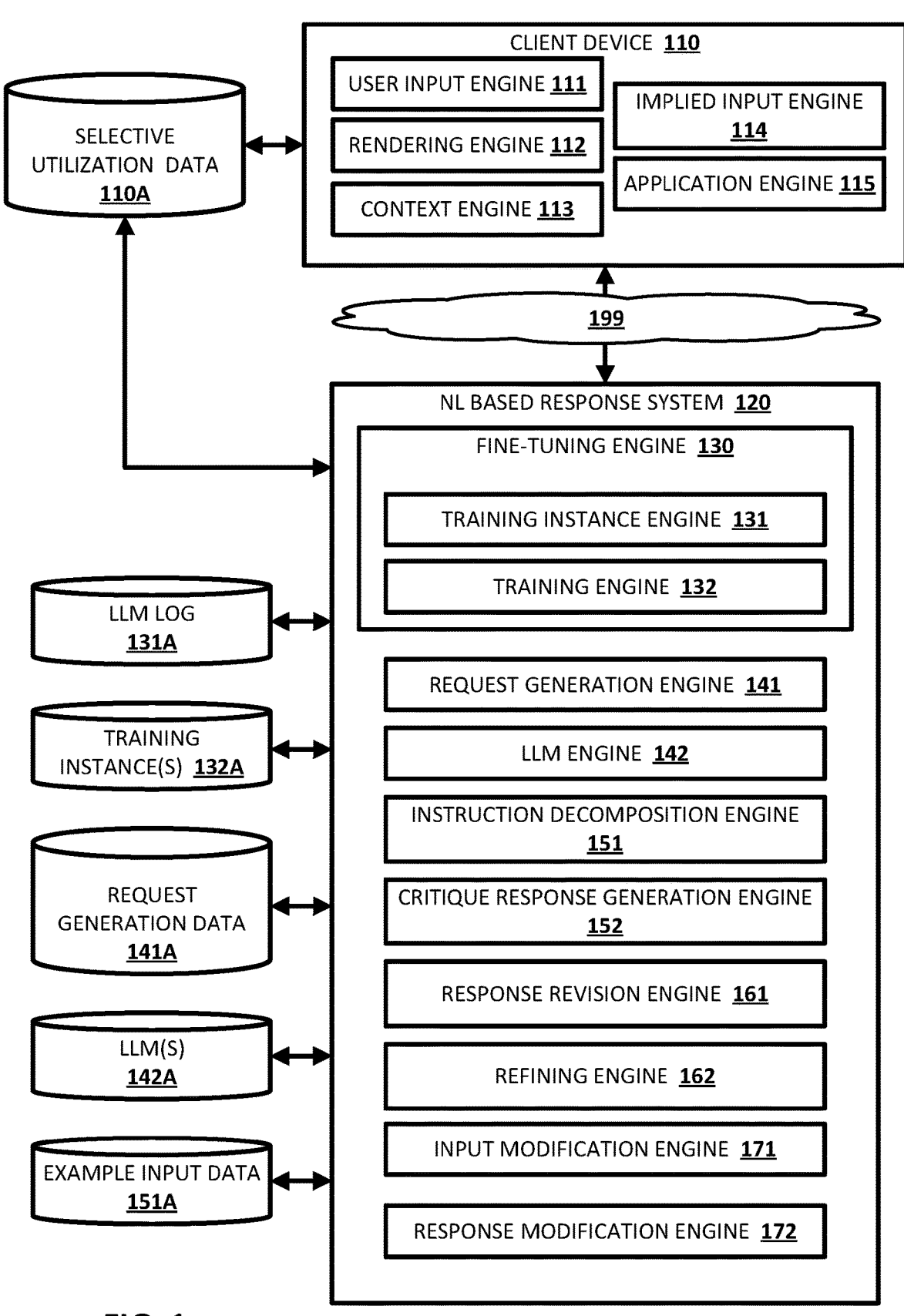
FIG. 1 depicts a block diagram of an example environment that demonstrates various aspects of the present disclosure, and in which some implementations disclosed herein can be implemented.

Turning now to FIG. 1, a block diagram of an example environment that demonstrates various aspects of the present disclosure, and in which some implementations disclosed herein can be implemented, is depicted.

The example environment includes a client device 110 and a NL based response system 120. In some implementations, all or some aspects of the NL based response system 120 can be implemented locally at the client device 110. In additional or alternative implementations, all or some aspects of the NL based response system 120 can be implemented remotely from the client device 110 as depicted in FIG. 1 (e.g., at remote server(s)). In those implementations, the client device 110 and the NL based response system 120 can be communicatively coupled with each other via one or more networks 199, such as one or more wired or wireless local area networks ("LANs," including Wi-Fi, mesh networks, Bluetooth, near-field communication, etc.) or wide area networks ("WANs", including the Internet).

The client device 110 can be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute one or more software applications, via application engine 115, through which NL based input can be submitted and/or NL based output and/or other output that is responsive to the NL based input can be rendered (e.g., audibly and/or visually). The application engine 115 can execute one or more software applications that are separate from an operating system of the client device 110 (e.g., one installed "on top" of the operating system)—or can alternatively be implemented directly by the operating system of the client device 110. For example, the application engine 115 can execute a web browser or automated assistant installed on top of the operating system of the client device 110. As another example, the application engine 115 can execute a web browser software application or automated assistant software application that is integrated as part of the operating system of the client device 110. The application engine 115 (and the one or more software applications executed by the application engine 115) can interact with the NL based response system 120.

In various implementations, the client device 110 can include a user input engine 111 that is configured to detect user input provided by a user of the client device 110 using one or more user interface input devices. For example, the client device 110 can be equipped with one or more microphones that capture audio data, such as audio data corresponding to spoken utterances of the user or other sounds in an environment of the client device 110. Additionally, or alternatively, the client device 110 can be equipped with one or more vision components that are configured to capture vision data corresponding to images and/or movements (e.g., gestures) detected in a field of view of one or more of the vision components. Additionally, or alternatively, the client device 110 can be equipped with one or more touch sensitive components (e.g., a keyboard and mouse, a stylus, a touch screen, a touch panel, one or more hardware buttons, etc.) that are configured to capture signal(s) corresponding to touch or typed input directed to the client device 110.

Some instances of an NL based input described herein can be a query for an NL response that is formulated based on user input provided by a user of the client device 110 and detected via user input engine 111. For example, the query can be a typed query that is typed via a physical or virtual keyboard, a suggested query that is selected via a touch screen or a mouse of the client device 110, a spoken voice query that is detected via microphone(s) of the client device 110 (and optionally directed to an automated assistant executing at least in part at the client device 110), or an image or video query that is based on vision data captured by vision component(s) of the client device 110 (or based on NL input generated based on processing the image using, for example, object detection model(s), captioning model(s), etc.). Other instances of a NL based input described herein can be a prompt for NL content that is formulated based on user input provided by a user of the client device 110 and detected via the user input engine 111. For example, the prompt can be a typed prompt that is typed via a physical or virtual keyboard, a suggested prompt that is selected via a touch screen or a mouse of the client device 110, a spoken prompt that is detected via microphone(s) of the client device 110, or an image prompt that is based on an image captured by a vision component of the client device 110.

In various implementations, the client device 110 can include a rendering engine 112 that is configured to render content (e.g., NL based response(s)) for audible and/or visual presentation to a user of the client device 110 using one or more user interface output devices. For example, the client device 110 can be equipped with one or more speakers that enable the content to be provided for audible presentation to the user via the client device 110. Additionally, or alternatively, the client device 110 can be equipped with a display or projector that enables the content to be provided for visual presentation to the user via the client device 110.

In various implementations, the client device 110 can include a context engine 113 that is configured to determine a context (e.g., current or recent context) of the client device 110 and/or of a user of the client device 110 (e.g., an active user of the client device 110 when the client device 110 is associated with multiple users). In some of those implementations, the context engine 113 can determine a context based on data stored in selective utilization data database 110A. The data stored in the selective utilization data database 110A can include, for example, user interaction data that characterizes current or recent interaction(s) of the client device 110 and/or a user of the client device 110, location data that characterizes a current or recent location(s) of the client device 110 and/or a user of the client device 110, user attribute data that characterizes one or more attributes of a user of the client device 110, user preference data that characterizes one or more preferences of a user of the client device 110, user profile data that characterizes a profile of a user of the client device 110 (e.g., whether the user has a subscription for utilization of the NL based response system 120, and, if so, optionally a level of the subscription for utilization of the NL based response system 120), and/or any other data accessible to the context engine 113 via the selective utilization data database 110A or otherwise.

For example, the context engine 113 can determine a current context based on a current state of a dialog session (e.g., considering one or more recent inputs provided by a user during the dialog session), profile data, and/or a current location of the client device 110. For instance, the context engine 113 can determine a current context of "best landmarks to visit in London" based on a recently issued query, profile data, and/or a current or an anticipated future location of the client device 110 (e.g., based on calendar information associated with the user accessible to the context engine

113). As another example, the context engine 113 can determine a current context based on which software application is active in the foreground of the client device 110, a current or recent state of the active software application, and/or content currently or recently rendered by the active software application. A context determined by the context engine 113 can be utilized, for example, in supplementing or rewriting NL based input that is formulated based on user input, in generating an implied NL based input (e.g., an implied query or prompt formulated independent of any explicit NL based input provided by a user of the client device 110), and/or in determining to submit an implied NL based input and/or to render result(s) (e.g., an NL based output) for an implied NL based input.

In various implementations, the client device 110 can include an implied input engine 114 that is configured to: generate an implied NL based input independent of any user explicit NL based input provided by a user of the client device 110; submit an implied NL based input, optionally independent of any user explicit NL based input that requests submission of the implied NL based input; and/or cause rendering of response(s) for the implied NL based input, optionally independent of any explicit NL based input that requests rendering of the response(s). For example, the implied input engine 114 can use one or more past or current contexts, from the context engine 113, in generating an implied NL based input, determining to submit the implied NL based input, and/or in determining to cause rendering of response(s) that is responsive to the implied NL based input. For instance, the implied input engine 114 can automatically generate and automatically submit an implied query or implied prompt based on the one or more past or current contexts. Further, the implied input engine 114 can automatically push the response(s) that is generated responsive to the implied query or implied prompt to cause them to be automatically rendered or can automatically push a notification of the response(s), such as a selectable notification that, when selected, causes rendering of the response(s). Additionally, or alternatively, the implied input engine 114 can submit respective implied NL based input at regular or non-regular intervals, and cause respective response(s) to be automatically provided (or a notification thereof automatically provided). For instance, the implied NL based input can be "automated assistant news" based on the one or more past or current contexts indicating a user's general interest in automated assistants, the implied NL based input or a variation thereof periodically submitted, and the respective response(s) can be automatically provided (or a notification thereof automatically provided). It is noted that the respective response(s) can vary over time in view of, e.g., presence of new/fresh search result document(s) over time.

Further, the client device 110 and/or the NL based response system 120 can include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

Although aspects of FIG. 1 are illustrated or described with respect to a single client device having a single user, it should be understood that is for the sake of example and is not meant to be limiting. For example, one or more additional client devices of a user and/or of additional user(s) can also implement the techniques described herein. For instance, the client device 110, the one or more additional client devices, and/or any other computing devices of a user can form an ecosystem of devices that can employ techniques described herein. These additional client devices and/or computing devices can be in communication with the client device 110 (e.g., over the network(s) 199). As another example, a given client device can be utilized by multiple users in a shared setting (e.g., a group of users, a household, a workplace, a hotel, etc.).

The NL based response system 120 is illustrated in FIG. 1 as including a fine-tuning engine 130, a request generation engine 141, an LLM engine 142, an instruction decomposition engine 151, a critique response generation engine 152, a response revision engine 161, a refining engine 162, an input modification engine 171, and a response modification engine 172. Some of these engines can be combined and/or omitted in various implementations. Further, these engines can include various sub-engines. For instance, the fine-tuning engine 130 is illustrated in FIG. 1 as including a training instance engine 131 and a training engine 132. Similarly, the sub-engines can be combined and/or omitted in various implementations. Accordingly, it should be understood that the various engines and sub-engines of the NL based response system 120 illustrated in FIG. 1 are depicted for the sake of describing certain functionalities and is not meant to be limiting.

Further, the NL based response system 120 is illustrated in FIG. 1 as interfacing with various databases, such as selective utilization data database 110A, LLM log database 131A, training instance(s) database 132A, request generation data database 141A, LLM(s) database 142A, and example input data database 151A. Although particular engines and/or sub-engines are depicted as having access to particular databases, it should be understood that this is for the sake of example and is not meant to be limiting. For instance, in some implementations, each of the various engines and/or sub-engines of the NL based response system 120 can have access to each of the various databases. Further, some of these databases can be combined and/or omitted in various implementations. Accordingly, it should be understood that the various databases interfacing with the NL based response system 120 illustrated in FIG. 1 are depicted for the sake of describing certain data that is accessible to the NL based response system 120 and is not meant to be limiting.

As described in more detail herein (e.g., with respect to FIGS. 2A-2D, 3, 4A, 4B, 5, 6A, 6B, 7A, 7B, and 8), the NL based response system 120 can be utilized to evaluate NL based input and response pairs, and, in some implementations, refine initial candidate responses generated based on an NL based input. For instance, an NL based input can be processed by the LLM engine 142, using an LLM stored in the LLM(s) database 142A, to generate the initial candidate responses. A set of instructions included in the NL based input data can be obtained by the instruction decomposition engine 141, for instance, based on processing an NL based input using an LLM stored in the LLM(s) database 142A. The initial candidate responses and the instructions included in a corresponding NL based input can be processed by the critique response generation engine 152 to generate critique responses, for instance, using an LLM stored in the LLM(s) database 142A. The critique responses can be indicative of a comparison between the initial candidate responses and the set of instructions (e.g., including an indication of whether a corresponding candidate response complies with each one of the instructions of the set of instructions, and optionally reasoning for the determination).

In some implementations, responses can be progressively refined using the refining engine 162. To refine responses, the responses can be revised based on processing the initial candidate responses and the corresponding critique responses by the response revision engine 161, for instance, using an LLM stored in the LLM(s) database 142A. This can be repeated a number of times using the refining engine 162 to ensure one or more of the initial candidate responses are refined to comply with the set of instructions.

The instruction generation, the critique response generation, and/or the response refining can be initiated based on processing, with the LLM, corresponding request generated by the request generation engine 141, and optionally using request generation data stored in the request generation data database 141A.

Figure 2A:
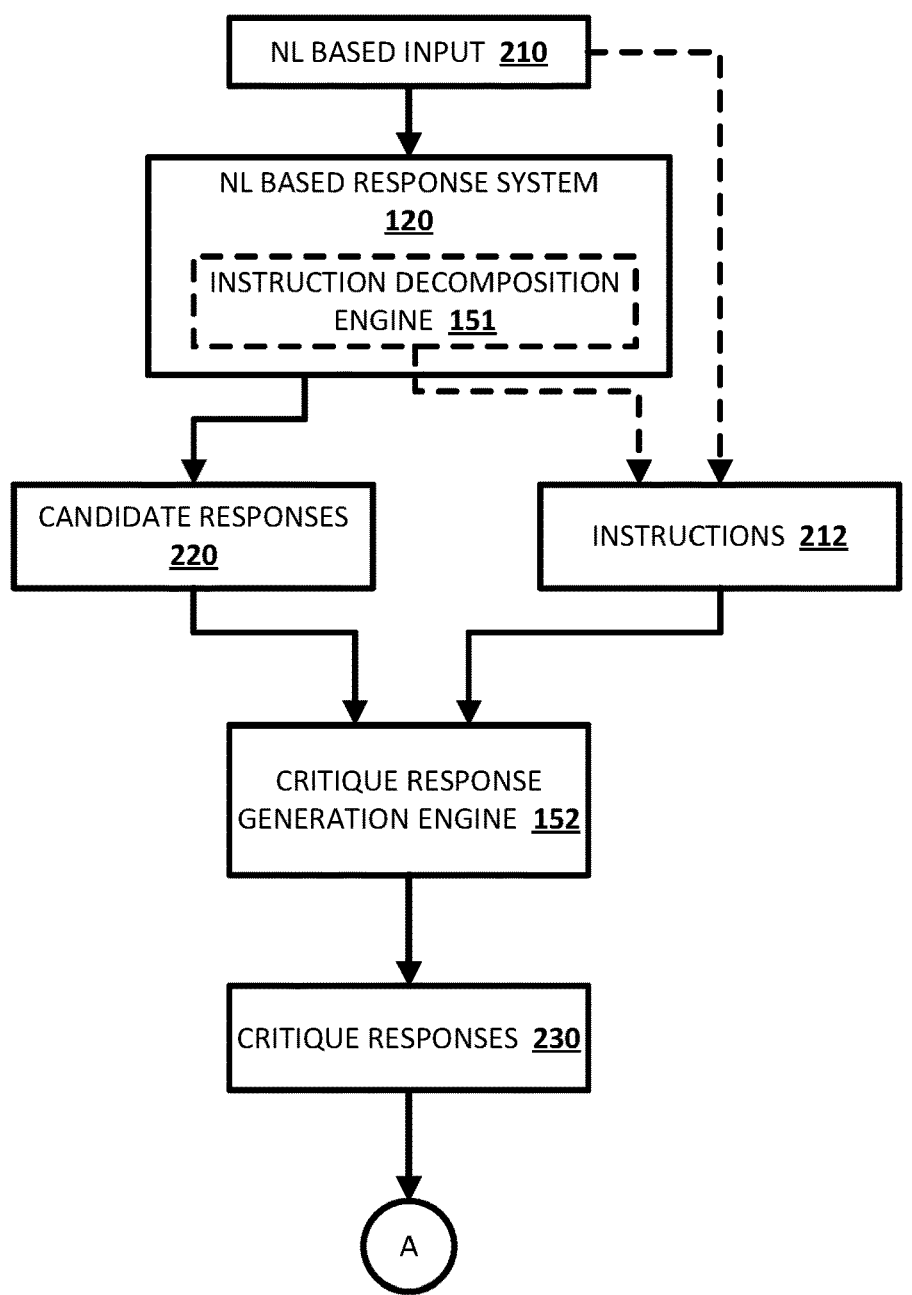
FIG. 2A depicts an example process flow for evaluating a candidate response to a NL based input generated using an NL based response system, in accordance with various implementations.
Figure 2B:
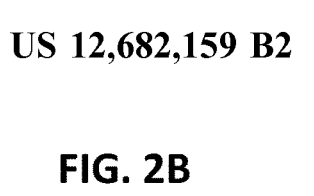
FIG. 2B depicts an example process flow for generating a response to a NL based input generated using an NL based response system, in accordance with various implementations.

In some implementations, the NL based input to be processed by the NL based response system 120 can be associated with a client device 110 (for instance, explicitly provided by a user of the client device 110 via the user input engine 111, implicitly provided by a user of the client device 110 via the implied input engine 114, etc.), and the self-evaluation and the progressive refining can be used to generate a particular response to be rendered (e.g., using rendering engine 112) at the client device 110 (e.g. as described with respect to FIGS. 2B, and 6A).

In additional or alternative implementations, the NL based input can be obtained from example input data stored in the LLM log database 131A and/or the example input data database 151A. In some of these implementations, the self-evaluation and progressive refining can be used to generate labelled training instances, including the NL based input and a refined response that is responsive to the NL based input (e.g., as described with respect to FIGS. 2C and 6B). In some others of these implementations, the self-evaluation can be used to generate labelled training instances, including a modified NL based input modified using input modification engine 171 and a response that is responsive to the modified NL based input (e.g., as described with respect to FIGS. 4A and 7A). In some further others of these implementations, the self-evaluation can be used to generate labelled training instances, including an NL based input and a modified response modified using response modification engine 172 (e.g., as described with respect to FIGS. 4B and 7B) and that is responsive to the NL based input. The training instances can be stored in the training instance(s) database 132A, for instance, using training instance engine 131. An LLM stored in the LLM(s) database 142A can be fine-tuned using the training engine 132 based on the training instances stored in the training instance(s) database 132A (e.g., as described in FIG. 5). Additional description of the various engines and/or sub-engines of the NL based response system 120 is provided herein with respect to FIGS. 2A-2D, 3, 4A, 4B, 5, 6A, 6B, 7A, 7B, and 8.

Turning now to FIG. 2A, an example process flow for evaluating a candidate response to a NL based input generated using an NL based response system (e.g., the NL based response system 120 from FIG. 1) is depicted. As discussed herein, an NL based input 210 can be obtained. The NL based input 210 can be provided to the NL based response system in order to obtain a response that is responsive to the NL based input 210. For instance, the NL based input 210 can include a query or a prompt. In some implementations, the NL based input 210 can include an intent to complete a particular task, for instance, to be fulfilled by an automated assistant or chatbot that is communicatively coupled to the NL based response system (e.g., via the network(s) 199).

The NL based input 210 can be processed using an NL based response system, such as the NL based response system 120 as described in relation to FIG. 1. The NL based response system 120 can generate LLM output based on processing the NL based input 210 (e.g., by the LLM engine 142 using an LLM stored in the LLM(s) database 142A). A plurality of candidate responses 220 can be determined, using the LLM output. In particular, the candidate responses 220 can be candidate LLM responses. Since LLMs can be described as being probabilistic, the candidate responses 220 can differ from one another, despite being generated based on the same NL based input 210 and using the same LLM. As such, it can be assumed that the extent to which the candidate responses 220 actually are responsive to the NL based input 210 will vary.

In some implementations, a set of instructions 212 included in the NL based input 210 can also be obtained. In some implementations, the set of instructions 212 can be extracted from the NL based input 210 by the NL based response system 120 (e.g., using the instruction decomposition engine 151). For instance, the set of instructions 212 can be generated based on processing the NL based input 210 with an LLM (e.g., the same LLM used in generating the candidate responses 220, or a different LLM stored in the LLM(s) database 142A).

In some versions of those implementations, the NL based response system 120 can extract the set of instructions 212 based on processing a request to extract the set of instructions 212 from the NL based input 210. The content of the request can be automatically generated during utilization of the NL based response system 120, or the content of the request can be generated prior to the utilization and retrieved (for instance, from request generation data database 141A) when required. In either case, the request to extract the set of instructions 212 can be generated based on the obtained content.

In some implementations, the request does not include any examples of instructions (e.g., it uses a so called "zero shot" approach). In this way, the set of instructions 212 extracted using the LLM can be less constrained and biased (e.g., by attributes of any examples provided).

In some implementations, the output format and/or style can be defined in the request. In this way, consistency in the output format and/or style can be ensured, and paraphrasing by the model can be prevented. As such, parsing of the output can be made more reliable.

As an example, a request for this purpose could be represented as:

"Given a 'query', your task is to provide a set of all the instruction constraints specified in the 'query' the critique responses 230 can be generated based on processing the candidate responses 220 using an LLM (e.g., the same LLM used to generate the candidate responses 220 and/or the set of instructions 212, or a different LLM). A corresponding critique response, of the critique responses 230, can be generated for each of the candidate responses 220. As such, each of the critique responses 230 can be indicative of an extent to which one or more of the corresponding candidate response 220 complies with the set of instructions 212. For instance, a given critique response 230 can include an indication of whether the corresponding candidate response 220 complies with each one of the instructions of the set of instructions 212. The critique responses 230 can also include a reasoning for why it has been determined that the candidate response 220 complies or does not comply with each of the instructions of the set of instructions 212. A score for each of the candidate responses 220 can thus be determined (or provided in the corresponding critique response) based on the number of instructions of the set of instructions 212 the candidate response is determined to comply with (e.g., as indicated by the corresponding critique response). The score can be, for example, in a range between 0 and 1. For instance, and not by way of limitation, if it is determined that a particular candidate response of the candidate responses 220 complies with three instructions out of the four instructions included in the set of instructions 212, a score for the particular candidate response 220 can be provided as 0.75.

In some implementations, the critique responses 230 can be generated based on processing a request for the LLM to generate the critique responses 230. For instance, the request can be generated and processed, along with the candidate responses 220 and the set of instructions 212, using the LLM. The content of the request for the LLM to generate the critique responses 230 can be predefined, or can be generated through utilization of the NL based response system 120.

As mentioned above in relation to the request to extract instructions from the NL based input, in some implementations, the request does not include any examples of critique responses for the LLM. In this way, the critique responses 230 generated using the LLM can be less constrained and biased (e.g., by attributes of any examples provided).

Similar to the request for instructions to be extracted from the NL based input, in some implementations, the output format and/or style can be defined in the request. In this way, consistency in the output format and/or style for this request can also be ensured, and paraphrasing by the model can be prevented. As such, parsing of the output can again be made more reliable.

```
Output:
{
    "instruction_constraint": List all the instruction constraints in the query by breaking it
down into individual verifiable components
}
Query: {query}
Response: {response}"
```

In various implementations, the NL based response system 120 can generate critique responses 230 based on processing the candidate responses 220 and the set of instructions 212 (and/or the NL based input 210) (e.g., using the critique response generation engine 152). For instance, As an example, a request for this purpose could be represented as:

"Given a 'response' and 'instruction constraints', your task is to evaluate how well the 'response' follows each of the 'instruction constraints'.

```
Output:
{
   For each instructional constraint in the 'instruction_constraints' output the following
keys
       "instruction_constraint": "selected instruction constraint",
       "reasoning": "provide comprehensive analysis on whether the above constraint
is satisfied by 'response' by referencing specific portions of response"
       "follows_instruction": Output 'false' if response does not satisfy the above
instruction constraint based on 'reasoning', otherwise output 'true'
}
   Instruction constraints: {instruction_constraints}
   Response: {response}"
```

In some implementations, the critique responses 230 can be generated based on processing the candidate responses 220 and the NL based input 210 itself using the critique response generation engine 152. In these implementations, the set of instructions can be extracted from the NL based input 210, and the candidate responses 220 can then be evaluated against the set of instructions 212 in a single step (e.g., based on processing, using the LLM, a single request in a so-called "one shot" approach). In this way, later parts of the request can reference earlier parts, resulting in a sequential dependency in the output of the LLM. In this way, compounding errors can be reduced. Furthermore, computational requirements can be reduced since the number of inferences performed by the LLM to generate the critique responses 230 can be reduced. This is particularly the case compared to, for instance, processing a request using the LLM for each instruction in the set of instructions.

As an example, a request for this purpose could be represented as:

"Given a 'query' and 'response', your task is to evaluate how well the 'response' follows each of the instruction constraints specified in the 'query'.

(e.g., in terms of which of the set of instructions 212 the corresponding response 220 complies with, or the reasoning provided for why this is the case), even though the same input data (e.g., the candidate response 220, and/or other input data described herein) is processed using the LLM. As such, the critique responses 230 (or the resulting scores determined thereof) for a corresponding candidate response 220 can be aggregated (e.g., averaged, summed, concatenated, most consistent response determined by evaluating "self-consistency", etc.). In this way, noise in the evaluation of the candidate responses 220 can be reduced, and robustness of the evaluation of the candidate responses 220 can be improved.

As described in relation to process flow 200A, each of the set of instructions 212 can be identified (or extracted) and evaluated against a candidate response 220 individually (e.g., via a so called "decomposition" approach). In this way, the evaluation of the candidate responses 220 can be reliable, even in the event that a particular NL based input includes many and/or complex instructions. For instance, by forcing the LLM to evaluate the responses against each instruction in turn, the LLM is prevented from ignoring or

```
Output:
{
   "instruction_constraints": List all of the instructional constraints in query by breaking
it down into individual verifiable components,
   For each instructional constraint in the 'instruction_constraints' output the following
keys
       "instruction_constraint": "selected instruction constraint",
       "reasoning": "provide comprehensive analysis on whether the above constraint
is satisfied by 'response' by referencing specific portions of response"
       "follows_instruction": Output 'false' if response does not satisfy the above
instruction constraint based on 'reasoning', otherwise output 'true'
}
   Query: {query}
   Response: {response}"
```

In some implementations, at least some of the instructions of the set of instructions 212 can relate to statistics of the candidate response (e.g., the instructions can specify a maximum number of characters, words, sentences, lines, paragraphs, etc.). In these implementations, the critique response generation engine 152 can employ a mathematical engine to determine the statistics of the candidate response (and whether the candidate response complies with the required statistics). In this way, errors in evaluation by the LLM resulting from hallucination by the LLM as to the statistics of a candidate response can be mitigated.

In some implementations, the operations of process flow 200A can be repeated a plurality of times. In other words, a plurality of critique responses 230 can be generated for each of the candidate responses 220. Since, as described herein, the LLM can be probabilistic, each of the critique responses 230 for a corresponding candidate response 220 can vary combining some of the instructions, or otherwise paraphrasing the critique of the response.

Turning now to FIG. 2B, an example process flow 200B for generating a response to a NL based input generated using an NL based response system (e.g., the NL based response system 120 from FIG. 1) is depicted. Initially, a determination 240 can be made (e.g., using refining engine 162) as to whether one or more termination criteria are satisfied. The termination criteria can include, for instance, a threshold extent to which a given candidate response complies with the set of instructions. For instance, if a given candidate response (e.g., from the initial candidate responses 220, or from refined candidate responses 260 as described below) complies with a greater number of instructions of the set of instructions 212 than a threshold number of instructions indicated by the termination criteria, the termination criteria can be determined to be satisfied. In this case, the determination 240 can be that the termination criteria are satisfied (e.g., as indicated as the "YES" path), with the given candidate response being selected as the selected candidate response 224. In some implementations, the termination criteria (e.g., and the threshold extent) can include a determination that a given candidate response complies with all of the instructions of the set of instructions 212.

Additionally, or alternatively, the termination criteria can include, for instance, one or more of: a threshold number of repetitions, a threshold execution time, a threshold number of processor cycles, a threshold memory utilization, etc. In this way, a maximum time and/or resource allocation can be defined for generating and/or refining a selected candidate response 224. In addition, a situation in which the process flow 200B will repeat indefinitely (e.g., if a candidate response with an above threshold extent cannot be generated using the NL based response system 120) can be avoided. In the event that the determination that the termination criteria are satisfied because processing time and/or computing resources have exceeded the defined threshold, a candidate response (e.g., from the candidate responses 220 and/or the refined candidate responses 260 as described below) can be selected as the selected candidate response 224 based on determining which of the candidate responses best complies with the set of instructions (e.g., based on the corresponding candidate response score) when the processing time and/or the computing resources have exceeded the defined threshold.

In the event that the determination 240 is made that the one or more termination criteria is not satisfied, the "NO" path can be followed, and a next node can be selected 245.

In many implementations, each of the initial candidate responses 220 can be considered to be a "root node" in a tree structure. As described herein, the initial candidate responses 220 can be refined to generate refined candidate responses 260. Each of the refined candidate responses 260 can therefore also be considered to be "nodes" in the tree structure, and "children" of the initial candidate response 220 used in their generation. Further, the refined candidate responses 260 can, in turn, be refined to generate further refined candidate responses 260, which themselves can be considered "nodes" in the tree structure, and "children" of the refined candidate responses 260 used in their generation. This can be repeated a number of times (e.g., until it is determined that the one or more termination criteria is satisfied).

As such, in order to determine which of the nodes should be selected 245, a next "node" can be selected, for instance, using refining engine 162. The next node can be selected 245 in any suitable way. For instance, in some implementations the next node (or candidate response) can be selected 245 based on an A* algorithm. Furthermore, in some implementations, the next node (or candidate response) can be selected 245 based on a recursive searching algorithm (e.g., the process flow 200B can generally be recursive). In some other implementations, the next node can be selected 245 sequentially, or randomly.

In some implementations, the next node (or candidate response) can be selected 245 based on determining which of the nodes represents the most promising next node (e.g., for generating a refined candidate response which better complies with the set of instructions). This can be determined based on determining which of the candidate responses best complies with the set of instructions (e.g., the candidate response associated with the highest score). A node which has already been expanded can be excluded from being expanded again (e.g., to avoid wasting computing resources).

In some implementations, each of the nodes (or candidate responses) can be arranged as a priority queue. As such, each of the nodes (or candidate responses) can be associated with a priority. The priority can be based on the critique response corresponding to the node (or candidate response). For instance, the priority can be, or can be determined based on, the candidate response's score. In these implementations, the next node (or candidate response) can be selected 245 based on searching the priority queue. The node with the highest priority (or in other words, the candidate response determined to best comply with the set of instructions 212) can be identified and selected 245 as the next node.

Although this selection 245 has been generally described in relation to a tree search algorithm, it will be appreciated that any suitable method can be used. Furthermore, although the each of the initial candidate responses 220 and the refined responses 260 have been described as nodes of a tree structure, it will be appreciated that these could otherwise be described together as a set of candidate responses, with each new generation of refined responses being added to the set of candidate responses.

By intelligently selecting 245 the next node in the manners described herein, the number of repetitions required to generate a refined candidate response 260 which satisfies the termination criteria can be reduced. As such the time and computing resources required in generating a given refined candidate response, of the refined candidate responses 260, which complies with the termination criteria can be reduced. In addition, even if the given refined candidate response is not generated before the termination criteria are satisfied (e.g., due to a maximum number of repetitions being exceeded), it can be assumed that the selected candidate response 224 will comply with the set of instructions to a higher extent than a selected candidate response 224 otherwise would.

Once the next node has been selected 245, one or more refined (or alternative) candidate responses 260 can be generated (e.g., using response revision engine 161). For instance, the candidate response 222 corresponding to the selected node and the corresponding critique response 232 can be processed using an LLM stored in the LLM(s) database 142A (e.g., the same LLM used previously or a different LLM).

In some implementations, the refined candidate responses 260 can be generated based on processing a request for the LLM to refine a candidate response 222. For instance, the request can be generated and processed, along with the candidate response 222 and the corresponding critique response 232 (and optionally the set of instructions 212), using the LLM. The content of the request for the LLM to generate the refined candidate responses 260 can be predefined, or can be generated through utilization of the NL based response system 120.

In some implementations, the output format and/or style can be defined in the request. In this way, consistency in the output format and/or style for this request can also be ensured, and paraphrasing by the model can be prevented. As such, parsing of the output can again be made more reliable.

In some implementations, the response revision engine 161 can be directed (e.g., via the request) to ensure that the refined candidate responses 260 generated comply with the instructions of the set of instructions 212 which the candidate response 222 was determined not to comply with (e.g., as indicated by critique response 232). For instance, each of the instructions the candidate response 222 was determined to violate can be identified (e.g., using the critique response 232). These instructions can then be provided (e.g., in the request) to increase the likelihood that the refined candidate responses 260 will better comply with the set of instructions 212. In some implementations, reasoning (e.g., from the critique response 232) as to why the candidate response 222 was determined to violate these instructions can also be provided. This can further improve the likelihood of the refined candidate responses better complying with the set of instructions e.g., by providing additional information in the request for the LLM to process. In implementations where multiple critique responses 232 are generated for the candidate response 222, the reasoning from one or more of the multiple critique responses for a particular instruction can be aggregated and provided. This can again even further improve the likelihood of the refined candidate responses better complying with the set of instructions e.g., by providing even more additional information in the request for the LLM to process.

The refined responses 260 can then be evaluated against the set of instructions 212 to generate critique responses 234. This can be performed in a similar manner as described in relation to the process flow 200A of FIG. 2A using, e.g., critique response generation engine 152.

The progressive refining process can then be repeated. For instance, a determination can be made as to whether any of the refined candidate responses 260 generated in this iteration comply with a threshold number of instructions at determination 240 (e.g., based on the critique response 234). If so, that refined candidate response 260 can be selected as the selected candidate response 224. Otherwise, a next node can be selected 245, with the refined candidate responses 260 having been added to the "tree structure" as additional nodes and as children of the candidate response 222 having been used in their generation (or in other words, having been added to the set of candidate responses).

Figure 3:
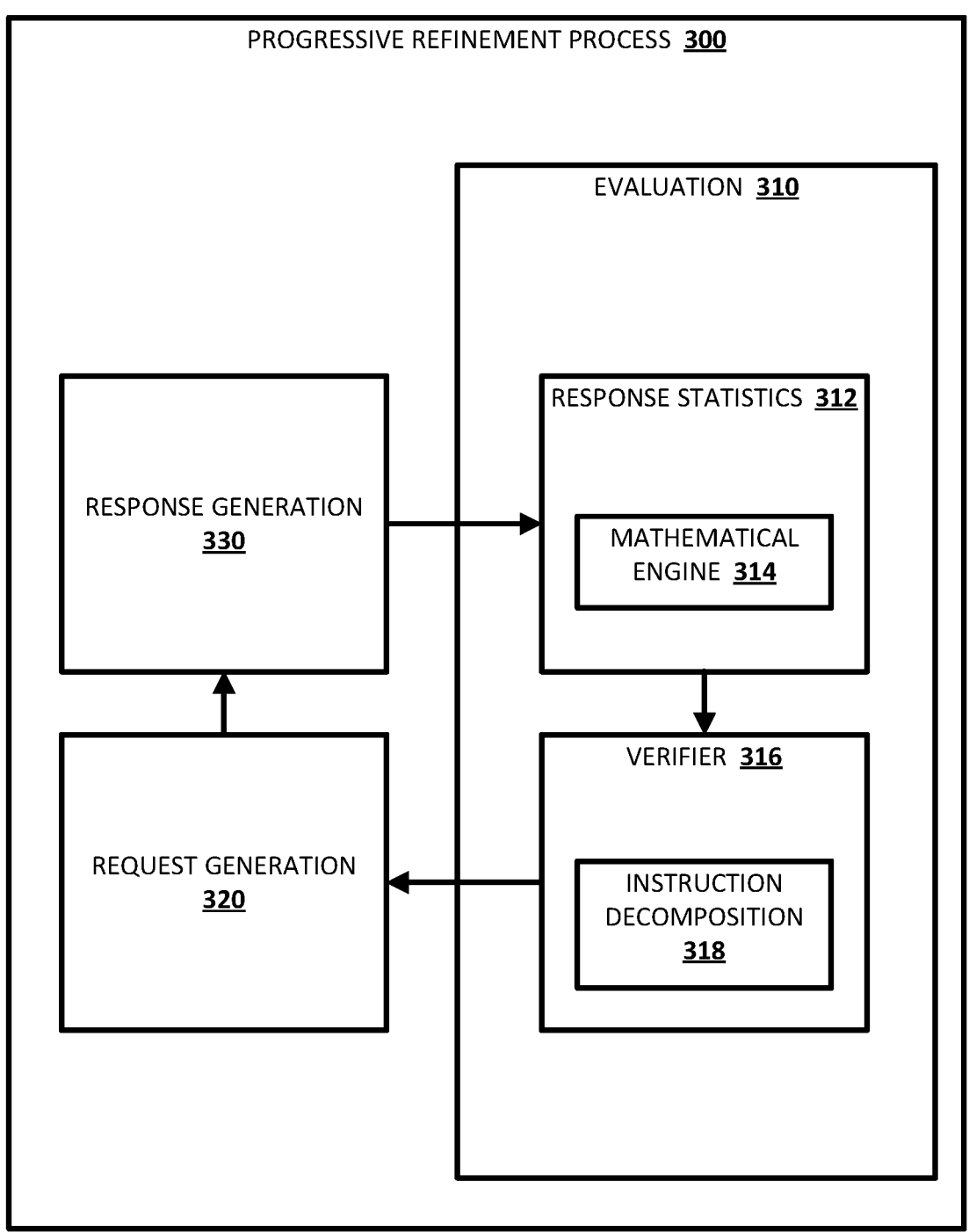
FIG. 3 depicts an example arrangement of a progressive refinement process, in accordance with various implementations.

As described herein, this progressive refining process can be performed repetitively (or in other words, cyclically), and in some implementations, recursively. For instance, turning briefly to FIG. 3, an example arrangement of the progressive refinement process 300 is depicted. As depicted in FIG. 3, the progressive refinement process 300 can include the self-evaluation process 310 (e.g., as described in relation to FIG. 2A), request generation 320, and response generation 330. As also depicted in FIG. 3, the self-evaluation process 310 can include determining response statistics 312 using a mathematical engine 314, and a verifier 316 based on instruction decomposition 318.

As described in more detail herein, a request can be generated at request generation 320 (e.g., using the request generation engine 141 of FIG. 1). This can be a request for a candidate response (which can be an initial candidate response or a candidate response which has already been refined in a previous iteration) to be refined. The request can be processed to generate a refined candidate response at response generation 330 (e.g., using the response revision engine 161).

The refined response can be evaluated using the self-evaluation process 310. In some implementations, the NL based input for which the refined response is responsive can include one or more instructions related to statistics of the response. As such, various response statistics (e.g., number of characters, words, sentences, lines, paragraphs, etc.) can be calculated for the response. The response statistics can be calculated using, for instance, mathematical engine 314

(e.g., rather than using an LLM itself, which may provide unreliable statistics information).

Verifier 316 can then then determine the extent to which the response complies with instructions included in an NL based input. For instance, the verifier 316 can generate a critique response (e.g., using the critique response generation engine 152). The critique response can indicate which of the instructions the refined response is determined to comply with or violate, and in some implementations, a reasoning for how these determinations have been made. The instructions can be provided to the verifier 316, or can be determined based on processing the NL based input using instruction decomposition 318 (e.g., based on instruction decomposition engine 151). Where the instructions relate to statistics of the response, the verifier 316 can use response statistics 312 calculated using mathematical engine 314. The critique response can then be provided to request generation 320 in order to generate the next request for the next repetition (or cycle).

Figure 2C:
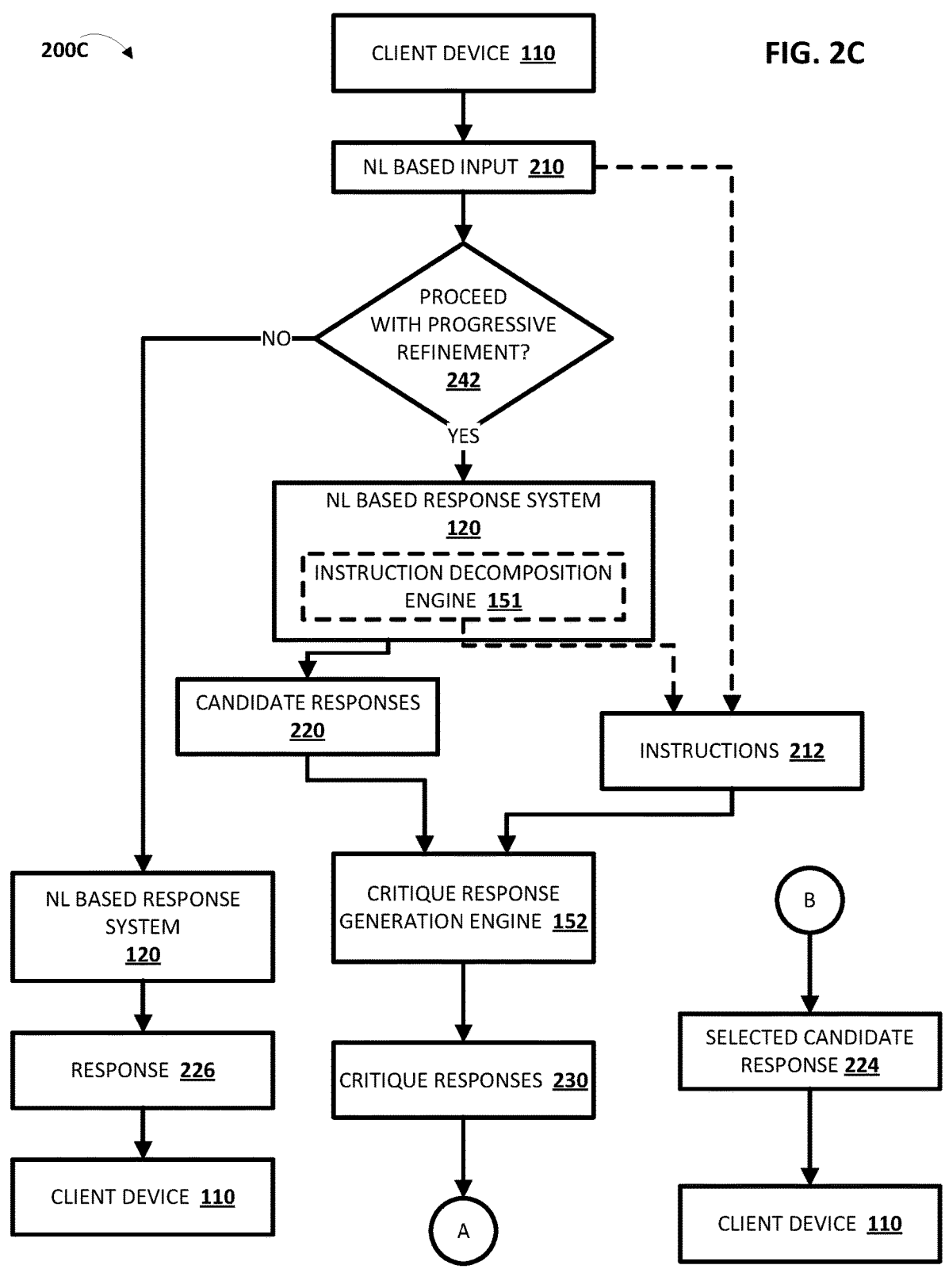
FIG. 2C depicts an example process flow for generating and causing display of a response to a NL based input associated with a client device using an NL based response system, in accordance with various implementations.

Turning now to FIG. 2C, an example process flow 200C for generating and causing display of a response to a NL based input associated with a client device using an NL based response system is depicted. The example process flow 200C of FIG. 2C is largely the same as the example process flow 200A described in relation to FIG. 2A. However, as shown in the process flow 200C of FIG. 2C, the NL based input 210 can be associated with the client device 110 from FIG. 1 (or another client device). Furthermore, the selected response 224 (e.g., generated according to example process flow 200B of FIG. 2B) can be provided for rendering at the client device 110 (e.g., via the rendering engine 112).

For instance, the NL based input 210 can be provided based on user input by a user of the client device 110. The user can provide the user input, for instance, by typing on a virtual or physical keyboard of the client device 110, providing speech which is captured by one or more microphones of the client device 110, selection (e.g., via tapping on a touch screen display, voice command, using a pointing device, etc.) a suggested input, providing gestures captured by one or more sensors of the client device 110, etc. Information indicative of the user input can be used to determine the NL based input 210. For instance, the information can include text entered, selected, or determined based on processing the user's speech using speech recognition. This text can then be provided as the NL based input 210. As another example the information can include one or more token(s) which can be used to determine the NL based input 210 (e.g., by the client device 110 or the NL based response system 120). The information can be provided to the NL based response system 120 by the client device 110, for instance via a wireless network (such as network 199).

Similarly, the selected response 224 (or information indicative of the selected response 224) can be provided to the client device 110 by the NL based response system 120 (e.g., via network 199). A command can also be sent to the client device 110 to cause the client device 110 to render the selected response 224 (e.g., via a display of the client device 110, via speaker(s) of the client device 110, etc.). However, in some implementations, it can be assumed that the client device 110, upon receiving the selected response 224, will render the selected response 224, without any explicit command to do so being received.

Although it has generally been described that the client device 110 to which the NL based input 210 is associated and the client device 110 which renders the selected response 224 are the same client device 110, in some implementations this may not be the case. In other words, the client device 110 which renders the selected response 224 can be a different client device 110 than the client device 110 which provided the NL based input 210. For instance, and not by way of limitation, the selected response 224 can be rendered on a display separate from (but possibly associated with, for instance, by virtue of a user account being signed-in on both devices) a smart speaker which received the NL based input 210.

In this way, the NL based response system 120, and particularly the self-evaluation mechanism described herein, can be utilized to generate responses to NL based inputs 210 associated with a client device 110 and cause rendering of selected responses 224 by the client device 110. In other words, the NL based response system 120 can be utilized to provide responses for a user and based on the processing by the LLM. As such, resources required to process repeated interactions (e.g., follow-up NL based input(s)) with the LLM (e.g., utilized by the NL based response system 120) which could otherwise occur in order to refine an initial response can be conserved. In addition, expert knowledge and experience required to formulate an NL based input in order to retrieve a particular response (which might include, for instance, evaluation and refining of intermediate responses) can be reduced and/or eliminated altogether.

In some implementations, a determination 242 as to whether progressive refinement should be performed. The determination can be based on contextual data and/or the content of the NL based input 210 (e.g., based on the type or number of instructions included in the NL based input 210, based on keywords or phrases included in the NL based input 210, etc.). In some implementations, the contextual data can be associated with the client device 110 and/or a user of the client device 110. For instance, the contextual data can include one or more of: a time, a location of the client device 110, preference data associated with a user account of the user (e.g., subscription service data), an application executing on the client device, and a subject and/or recipient of a message displayed on the client device. The contextual data can be retrieved, for instance, from the selective utilization data database 110A.

In some implementations, the determination 242 can be based on whether an initial response generated based on processing the NL based input 210 complies with a threshold number of instructions included in the NL based input 210 (e.g., all of the instructions included in the NL based input 210). For instance, the determination can include generating an initial response based on processing the NL based input using an LLM (e.g., an LLM stored in LLM(s) database 142A). A corresponding critique response can then be generated based on processing the initial response using the LLM (e.g., using critique response generation engine 152). The corresponding critique response can include an indication of the extent to which the LLM response complies with the set of instructions included in the NL based input. It can then be determined, based on the critique response, that the extent to which the initial response complies with the set of instructions is above or below a threshold extent. Responsive to determining that the extent to which the initial response complies with the instructions is above the threshold, it can be determined that progressive refinement need not be performed (e.g., and thus prevented from being executed). However, and responsive to determining that the extent to which the initial response complies with the instructions is below the threshold, it can be determined that progressive refinement be performed.

In the event that progressive refinement is determined not to be performed, a response 226 can be generated based on processing the NL based input 210 using the NL based response system 120 (e.g., using an LLM thereof). The response 226 can then be rendered on the client device 110 (e.g., rather than the selected response 224). In this way, in situations that progressive refinement is not performed (e.g., if the LLM can generate a response to the NL based input 210 which is satisfactory without the use of progressive refinement), computational resources which would otherwise be consumed can be conserved.

Figure 2D:
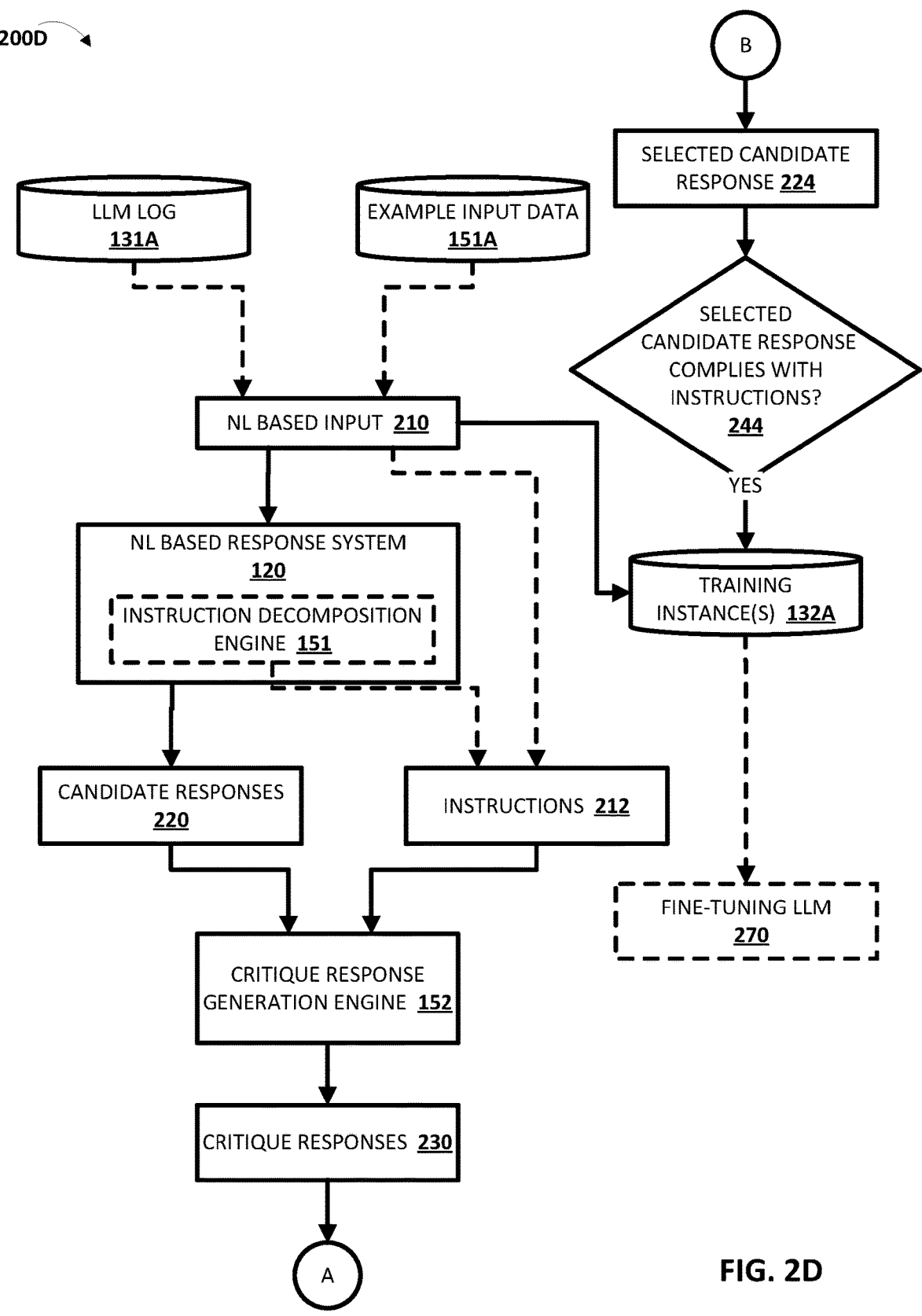
FIG. 2D depicts an example process flow for generating training instances by generating a response to an NL based input using an NL based response system, in accordance with various implementations.

Turning now to FIG. 2D, an example process flow 200D for generating training instances by generating a response to an NL based input 210 using an NL based response system 120 is depicted. The example process flow 200D of FIG. 2D is largely the same as the example process flow 200A described in relation to FIG. 2A. However, as shown in the process flow 200D of FIG. 2D, the NL based input 210 can be obtained from an LLM log database 131A and/or example input data database 151A. Furthermore, the selected response 224, the NL based input 210, and optionally the corresponding critique response can be stored in a training instance(s) database 132A.

In some implementations, a determination 244 can be made as to whether the selected candidate response 224 complies with the set of instructions 212 to at least a threshold extent prior to being stored. In the event the determination 244 is in the negative, storing the response as a training instance can be prevented. In this way, if a candidate response 224 is selected due to the termination criteria being satisfied (e.g., due to a number of repetitions being exceeded), but does not comply with the set of instructions 212 to a threshold extent, storing of the selected candidate response 224 can be avoided. As such, the quality of training instances in the training instance(s) database 132A can be ensured.

In some implementations, the NL based inputs stored in example input data database 151A can be provided by users, e.g., as examples of "hard" prompts. In some additional or alternative implementations, the LLM log database 131A can include a historical log of NL based inputs provided by one or more users as input to an LLM (e.g., an LLM stored in LLM database 131A), and optionally, a corresponding response generated in response to the NL based input 210.

In some implementations, the NL based input 210 can be identified from NL based inputs stored in LLM log database 131A and/or example input data database 151A. Identifying the NL based input 210 can be based on one or more selection criteria. The selection criteria can be based on, for instance, the content of the NL based input 210 (e.g., particular words or phrases present in the NL based input 210). Additionally, or alternatively, the selection criteria can include a determination that a corresponding response generated based on processing the NL based input 210 has a quality metric below a threshold quality metric. The corresponding response can be generated at a previous time and retrieved from the LLM log database 131A and/or the example input data database 151A. Alternatively, the corresponding response can be generated using the NL based response system 120 in the same or similar manner to any of the manners described herein.

In some implementations, the quality metric can include an extent to which the corresponding response complies with a set of instructions included in the particular NL based input. This can be determined based on evaluating the NL based input 210 and the corresponding candidate responses 220. For instance, corresponding critique responses 230 can be generated based on processing the corresponding candidate responses 220 (e.g., using the critique response generation engine 152). The corresponding critique responses 230 can include an indication of the extent to which the corresponding candidate responses 220 complies with the set of instructions 212 included in the NL based input 210, which can then be used as (or to determine) the quality metric.

In some additional or alternative implementations, the quality metric of the corresponding response can be user generated. For instance, at a previous time, a user can be presented with the NL based input 210 (or the set of instructions 212) and the corresponding response. The user can thus provide feedback as to how well the corresponding response complies with the instructions included in the NL based input 210. This data can be stored together with the NL based input 210 and the response in the LLM log database 131A and/or the example input data database 151A, and retrieved accordingly.

Figure 4A:
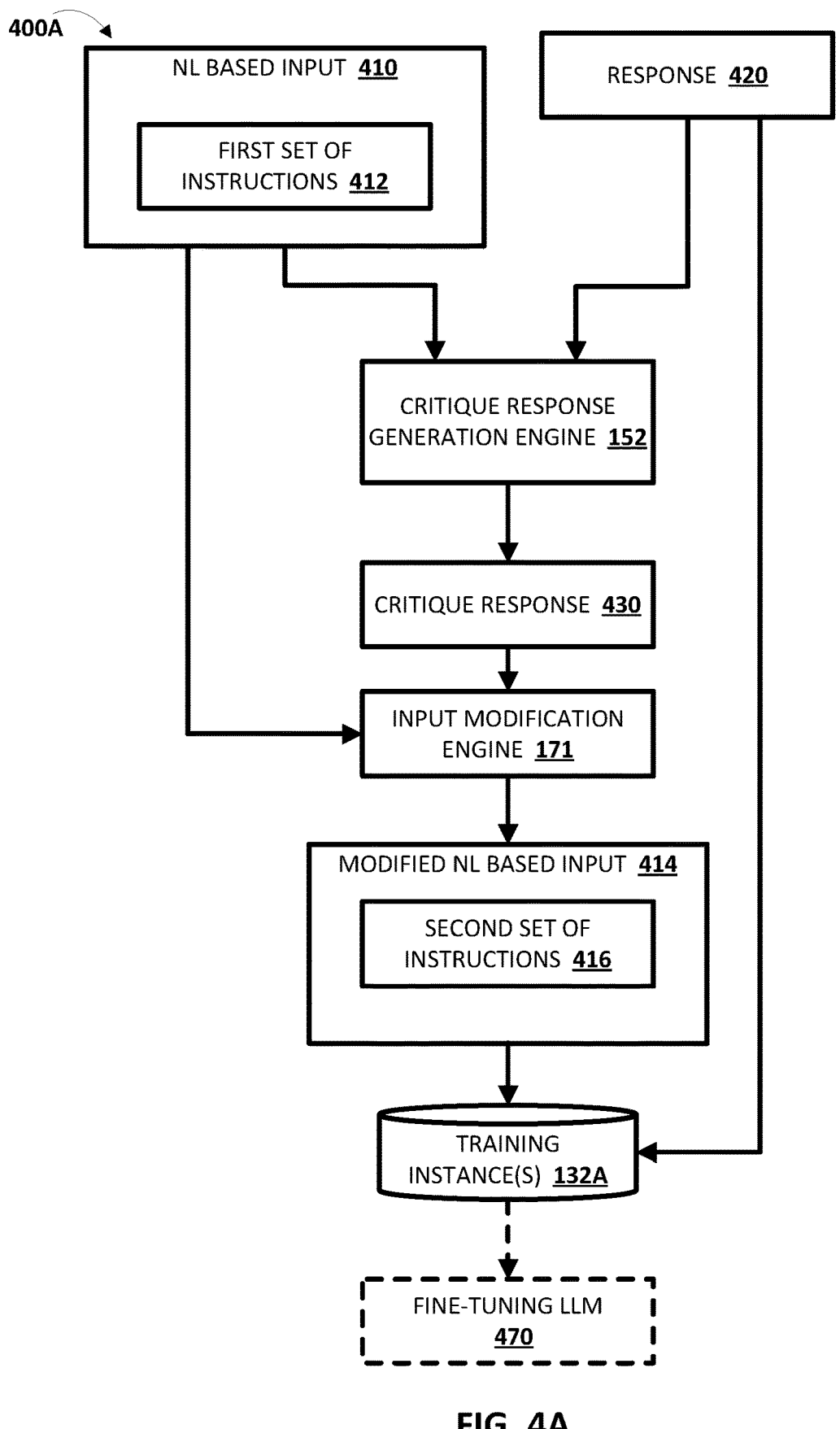
FIG. 4A depicts an example process flow for generating training instances by modifying an NL based input for an NL based response system, in accordance with various implementations.

The training instance(s) database 132A can include training instances generated as described in relation to FIG. 2D, and optionally further obtained in any other way (e.g., in the same or similar manners to the manners described in relation to FIGS. 4A and/or 4B, manual generation of training instances, etc.). In this way, labelled training data can be generated without the need for manual human labelling. This can greatly reduce the resources required to obtain training data to fine-tune an LLM (e.g., utilized by the NL based response system 120).

Once the training instance(s) have been generated in this manner, the NL based response system 120 (or an LLM thereof), can be fine-tuned (or otherwise termed, train) using the training instances stored in the training instance(s) database 132A (e.g., using training engine 132). This can be performed in any suitable way (e.g., supervised learning, reinforcement learning, etc.).

Figure 5:
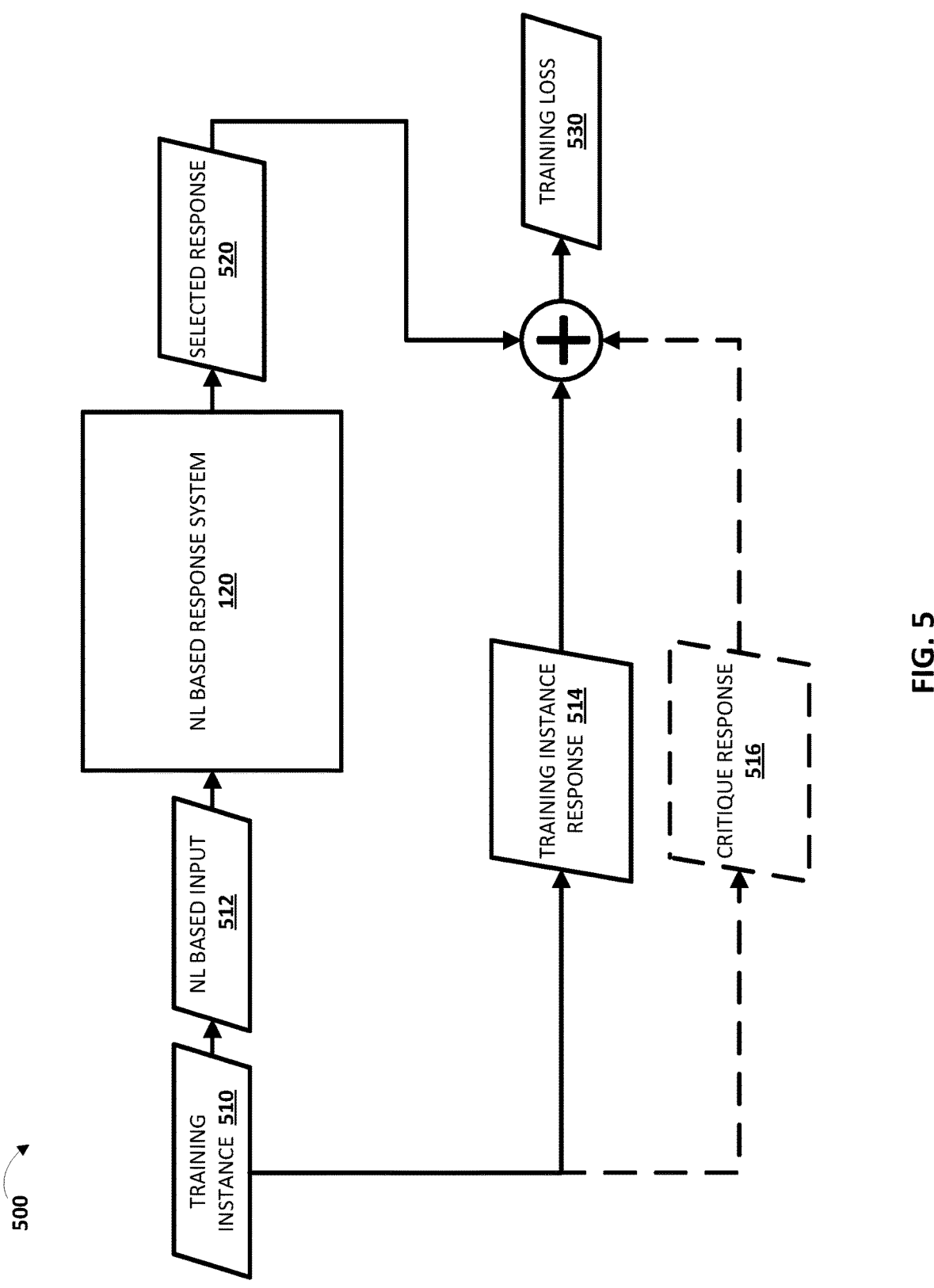
FIG. 5 depicts an example process flow for fine-tuning a large language model, in accordance with various implementations.

For instance, and referring briefly to FIG. 5, an example process flow 500 for fine-tuning a LLM (e.g., utilized by the NL based response system 120) is depicted. As shown in FIG. 5, an NL based input 512 and a training instance response 514 can be obtained from a particular training instance 510 (which can be retrieved, e.g., from the training instance(s) database 132A). A selected response 520 can be generated based on processing the NL based input 512 using the NL based response system 120 (or using an LLM thereof), for instance, as described in relation to FIGS. 2A and 2B. The selected response 520 can be compared with the training instance response 514 to generate a training loss 530. Comparing the selected response 520 with the training instance response 514 can include, for instance, tokenization, natural language understanding (NLU), natural language processing (NLP), etc. For instance, rather than the responses themselves being compared, embeddings generated (in any suitable way) based on the responses can be compared (e.g., in an embedding space or another lower-level latent space representation) to generate the training loss 530. Moreover, the LLM can be updated based on the training loss 530.

In some implementations, additional data, such as the critique response 516 corresponding to the training instance response 514 can be obtained from the training instance 510 as well. The critique response 516 can be included in the comparison between the selected response 520 and the training instance response 514. The critique response 516 can be used to provide a weighting to the comparison when generating the training loss 530. For instance, if the critique response 516 indicates that the training instance response

514 is of a very high quality (e.g. if it is determined to comply with all of the instructions identified in the NL based input 512, for instance based on the training instance response 514 score), a difference between the selected response 520 and the training instance response 514 can be propagated to a greater extent (e.g. by determining a larger training loss 530, by giving the training loss 530 a greater significance during training, etc.), and vice versa. As another example, the critique response 516 can be used to train a separate reward model for use in fine-tuning the LLM (e.g., utilized by the NL based response system 120) using reinforcement learning.

Once the LLM (e.g., utilized by the NL response system 120) has been fine-tuned, the fine-tuned LLM can be deployed for use in generating responses to NL based input. In some cases, the NL based response system 120 can be updated with the fine-tuned LLM for use in inference (e.g., in the manner described in relation to FIG. 2C) or in further generation of training data and fine-tuning (e.g. in the manner described in relation to FIG. 2D).

Although it has generally been described that training instances can be generated using self-evaluation together with progressive refinement (e.g., as described in relation to FIG. 2D), it will be appreciated that training instances can also be generated in other manners, which do not, for instance, include progressive refinement. For instance, turning now to FIG. 4A, an example process flow 400A for generating training instances by modifying an NL based input 410 for an NL based response system 120, in accordance with various implementations is depicted.

An NL based input 410 and a corresponding response 420 can be obtained in any suitable manner (e.g., in the same or similar manner to that described in relation to FIG. 2D). For instance, the NL based input 410 (and optionally the response 420) can be retrieved from the LLM log database 131A and/or the example input data database 151A. The response 420 can be evaluated against a first set of instructions 412 included in the NL based input 410 to generate a critique response 430 (e.g., in the same or similar manner to that described in relation to FIG. 2A or 2D). The critique response 430 can indicate whether the response 420 complies with each of the instructions of the first set of instructions 412. For instance, the critique response 430 can include an indication of at least one instruction of the first set of instructions 412 the response 420 is determined to violate.

Based on the critique response 430, the NL based input 410 can be modified to generate a modified NL based input 414 including a second set of instructions 416, for instance using input modification engine 171. In particular, the NL based input 410 can be modified such that the response 420 complies with each of the second set of instructions. This modification can be performed in any suitable manner. For instance, in some implementations, the NL based input 410 can be modified to simply delete any of the instructions of the first set of instructions 412 that the response 420 is determined to violate (e.g., based on the critique response 430). In some additional or alternative implementations, it can be determined that the response 420 violates instructions relating to statistics of the response. In this case, the NL based input can be modified such that the second set of instructions specifies response statistics that the response 420 does exhibit. As a non-limiting example, the NL based input 410 can include an instruction to generate a response to include a maximum of five words. It can be determined (e.g., using the critique response 430) that the response 420 includes six words, and thus does not comply with the instruction to include a maximum of five words. As such, the NL based input 410 can be modified to instead include an instruction to include a maximum of six words.

In some implementations, the response 420 can be evaluated against the second set of instructions, for instance, using the critique response generation engine 152 in the same or similar manner to that described in relation to FIG. 2A. In this way, it can be verified that the response 420 does actually comply with each instruction of the second set of instructions.

Once the NL based input 410 has been modified (and optionally verified), the modified NL based input 410 can be stored together with the response 420 (and optionally also with a corresponding critique response generated, for instance, for the verification) as a training instance in the training instance(s) database 132A.

In some implementations, the LLM can be fine-tuned at block 470 using the training instances stored in the training instance(s) database 132A. This can be performed in any suitable way, for instance, in the same or similar manner to that described in relation to FIG. 5. Similarly, as described in relation to FIG. 5, subsequent to the fine-tuning, the fine-tuned LLM can be deployed for inference or for generating further training data.

Figure 4B:
FIG. 4B depicts an example process flow for generating training instances by modifying a response to an NL based input generated by an NL based response system, in accordance with various implementations.

Turning to FIG. 4B, an example process flow 400B for generating training instances by modifying a response 420 to an NL based input 410 generated by an NL based response system is depicted. The operations of FIG. 4B are largely similar to those described in relation to FIG. 4A. However, rather than a modification of the NL based input being performed, the response 420 can be modified, for instance using response modification engine 172.

In particular, the response 420 can be modified based on identifying which of the instructions of the first set of instructions 412 the response violates. The response 420 can then be modified such that the modified response 422 complies with each of the first set of instructions 412. For instance, in some cases, the NL based input 410 can include instructions which relate to statistics of the response 420. The critique response 430 can thus indicate that the response 420 does not comply with the instructions relating to the response statistics. As such, the response 420 can be modified such that the modified response 422 does comply with the instructions relating to the response statistics. As a non-limiting example, assume that the NL based input 410 includes an instruction that the response 420 should include no more than ten words. Assume further that the response 420 includes twenty words, and that the critique response 430 thus indicates that the response 420 does not comply with this instruction. In this case, the response can be modified such that any words after the tenth word are deleted, such that the modified response 422 will comply with the instruction to include no more than ten words.

In some implementations, the modified response 422 can be evaluated against the first set of instructions 412, for instance, using the critique response generation engine 152 in the same or similar manner to that described in relation to FIG. 2A. In this way, it can be verified that the modified response 422 does actually comply with each instruction of the first set of instructions 412.

Once the response has been modified (and optionally verified), the NL based input 410 can be stored together with the modified response 422 (and optionally also with a corresponding critique response generated, for instance, for the verification) as a training instance in the training instance(s) database 132A.

In this way, as a result of the approaches described in relation to FIGS. 4A and 4B, self-evaluation can be used in the generation of high quality examples of responses to given NL based inputs for use as training data, without requiring, for instance, manual labeling or creation of training data, or manual modification of NL based inputs and/or responses. Furthermore, the approaches described in relation to FIGS. 4A and 4B can generate labelled training data in a relatively low cost way in terms of computational resource consumption. This is particularly the case with relatively simple instructions where relatively minor modifications can result in a corresponding NL based input and response pair without requiring, for instance, further inferences with an LLM.

Turning now to FIG. 6A, a flowchart illustrating an example method 600A of utilizing an NL based response system to generate a response to an NL based input associated with a client device is depicted. For convenience, the operations of the method 600A are described with reference to a system that performs the operations. This system of the method 600A includes one or more processors, memory, and/or other component(s) of computing device(s) (e.g., client device 110 of FIG. 1, NL based response system 120 of FIGS. 1 to 5, computing device 910 of FIG. 9, one or more servers, and/or other computing devices). Moreover, while operations of the method 600A are shown in a particular order, this is not meant to be limiting. One or more operations may be reordered, omitted, and/or added.

At block 602, the system receives NL based input associated with a client device (e.g., in the same or similar manner described with respect to FIGS. 2A, 2B, 2C, and/or in other manners described herein).

At block 604, the system generates a plurality of candidate LLM responses based on processing the NL based input using an LLM, wherein the plurality of candidate LLM responses together form a set of candidate LLM responses (e.g., in the same or similar manner described with respect to FIGS. 2A, 2B, 2C, and/or in other manners described herein).

At block 606, the system generates, for each of the plurality of candidate LLM responses, a corresponding critique response (e.g., in the same or similar manner described with respect to FIGS. 2A, 2B, 2C, and/or in other manners described herein). The corresponding critique responses can be generated based on processing the plurality of candidate LLM responses using the LLM. Each of the corresponding critique responses can include an indication of the extent to which the corresponding candidate LLM response complies with a set of instructions included in the NL based input.

At block 608, the system progressively refines, until it is determined that one or more termination criteria are satisfied, the candidate LLM responses (e.g., in the same or similar manner described with respect to FIGS. 2A, 2B, 2C, and/or in other manners described herein). For instance, the system can determine whether the one or more termination criteria are satisfied. When it is determined that the one or more termination criteria are not satisfied, the system can progressively refine, until it is determined that the one or more termination criteria are satisfied, the set of candidate LLM responses based on processing candidate LLM responses from the set of candidate responses using the LLM. When it is determined that the one or more termination criteria are satisfied (e.g., prior to or during the refining), the system can proceed to block 610.

At block 610, the system selects, based on the corresponding critique response, a candidate LLM response from among the set of candidate responses (e.g., in the same or similar manner described with respect to FIGS. 2A, 2B, 2C, and/or in other manners described herein).

At block 612, the system causes the selected candidate LLM response to be rendered at the client device (e.g., in the same or similar manner described with respect to FIGS. 2A, 2B, 2C, and/or in other manners described herein).

Turning now to FIG. 6B, a flowchart illustrating an example method 600B of generating training instances by utilizing an NL based response system to generate a response to an NL based input is depicted. For convenience, the operations of the method 600B are described with reference to a system that performs the operations. This system of the method 600B includes one or more processors, memory, and/or other component(s) of computing device(s) (e.g., client device 110 of FIG. 1, NL based response system 120 of FIGS. 1 to 5, computing device 910 of FIG. 9, one or more servers, and/or other computing devices). Moreover, while operations of the method 600B are shown in a particular order, this is not meant to be limiting. One or more operations may be reordered, omitted, and/or added.

At block 630, the system obtains NL based input (e.g., in the same or similar manner described with respect to FIGS. 2A, 2B, 2C, and/or in other manners described herein).

At block 632, the system generates a plurality of candidate LLM responses based on processing the NL based input using an LLM, wherein the plurality of candidate LLM responses together form a set of candidate LLM responses (e.g., in the same or similar manner described with respect to FIGS. 2A, 2B, 2C, and/or in other manners described herein).

At block 634, the system generates, for each of the plurality of candidate LLM responses, a corresponding critique response (e.g., in the same or similar manner described with respect to FIGS. 2A, 2B, 2C, and/or in other manners described herein). The corresponding critique responses can be generated based on processing the plurality of candidate LLM responses using the LLM. Each of the corresponding critique responses can include an indication of the extent to which the corresponding candidate LLM response complies with a set of instructions included in the NL based input.

At block 636, the system progressively refines, until it is determined that one or more termination criteria are satisfied, the candidate LLM responses (e.g., in the same or similar manner described with respect to FIGS. 2A, 2B, 2C, and/or in other manners described herein). For instance, the system can determine whether one or more termination criteria are satisfied. When it is determined that the one or more termination criteria are not satisfied, the system can progressively refine, until it is determined that the one or more termination criteria are satisfied, the set of candidate LLM responses based on processing candidate LLM responses from the set of candidate responses using the LLM. When it is determined that the one or more termination criteria are satisfied (e.g., prior to or during the refining), the system can proceed to block 638.

At block 638, the system selects, based on the corresponding critique response, a candidate LLM response from among the set of candidate responses (e.g., in the same or similar manner described with respect to FIGS. 2A, 2B, 2C, and/or in other manners described herein).

At block 640, the system stores, as an instance of training data for fine-tuning the LLM, the NL based input along with the second candidate LLM response (e.g., in the same or similar manner described with respect to FIGS. 2A, 2B, 2C, and/or in other manners described herein).

Turning now to FIG. 7A, a flowchart illustrating an example method 700A of generating training instances by modifying an NL based input for an NL based response system is depicted. For convenience, the operations of the method 700A are described with reference to a system that performs the operations. This system of the method 700A includes one or more processors, memory, and/or other component(s) of computing device(s) (e.g., client device 110 of FIG. 1, NL based response system 120 of FIGS. 1 to 5, computing device 910 of FIG. 9, one or more servers, and/or other computing devices). Moreover, while operations of the method 700A are shown in a particular order, this is not meant to be limiting. One or more operations may be reordered, omitted, and/or added.

At block 702, the system obtains NL based input (e.g., in the same or similar manner described with respect to FIG. 4A, and/or in other manners described herein).

At block 704, the system obtains a LLM response which has been generated based on processing the NL based input using an LLM (e.g., in the same or similar manner described with respect to FIG. 4A, and/or in other manners described herein).

At block 706, the system generates a critique response for the LLM response, the critique response for the LLM response being generated based on processing the LLM response using the LLM (e.g., in the same or similar manner described with respect to FIG. 4A, and/or in other manners described herein). The NL based input can include a first set of instructions, and the critique response can include an indication of at least one instruction of the first set of instructions which the LLM response is determined to violate.

At block 708, the system can modify the NL based input such that the modified NL based input includes a second set of instructions (e.g., in the same or similar manner described with respect to FIG. 4A, and/or in other manners described herein), wherein the LLM response does comply with each instruction in the second set of instructions.

At block 710, the system can store the modified NL based input and the LLM response as an instance of training data (e.g., in the same or similar manner described with respect to FIG. 4A, and/or in other manners described herein).

Turning now to FIG. 7B, a flowchart illustrating an example method 700B of generating training instances by modifying a response to an NL based input generated by an NL based response system is depicted. For convenience, the operations of the method 700B are described with reference to a system that performs the operations. This system of the method 700B includes one or more processors, memory, and/or other component(s) of computing device(s) (e.g., client device 110 of FIG. 1, NL based response system 120 of FIGS. 1 to 5, computing device 910 of FIG. 9, one or more servers, and/or other computing devices). Moreover, while operations of the method 700B are shown in a particular order, this is not meant to be limiting. One or more operations may be reordered, omitted, and/or added.

At block 720, the system obtains NL based input (e.g., in the same or similar manner described with respect to FIG. 4B, and/or in other manners described herein).

At block 722, the system obtains a LLM response which has been generated based on processing the NL based input using an LLM (e.g., in the same or similar manner described with respect to FIG. 4B, and/or in other manners described herein).

At block 724, the system generates a critique response for the LLM response, the critique response for the LLM response being generated based on processing the LLM response using the LLM (e.g., in the same or similar manner described with respect to FIG. 4B, and/or in other manners described herein). The NL based input can include a set of instructions, and the critique response can include an indication of at least one instruction of the set of instructions which the LLM response is determined to violate.

At block 726, the system can modify the LLM response such that the modified LLM response complies with the at least one instruction (e.g., in the same or similar manner described with respect to FIG. 4B, and/or in other manners described herein).

At block 728, the system can store the NL based input and the modified LLM response as an instance of training data (e.g., in the same or similar manner described with respect to FIG. 4B, and/or in other manners described herein).

Turning now to FIG. 8, a flowchart illustrating an example method 800 of utilizing an NL based response system to generate a response to an NL based input associated with a client device is depicted. For convenience, the operations of the method 800 are described with reference to a system that performs the operations. This system of the method 800 includes one or more processors, memory, and/or other component(s) of computing device(s) (e.g., client device 110 of FIG. 1, NL based response system 120 of FIGS. 1 to 5, computing device 910 of FIG. 9, one or more servers, and/or other computing devices). Moreover, while operations of the method 800 are shown in a particular order, this is not meant to be limiting. One or more operations may be reordered, omitted, and/or added.

At block 802, the system receives NL based input associated with a client device (e.g., in the same or similar manner described with respect to FIGS. 2A, 2B, 2C, and/or in other manners described herein).

At block 804, the system determines, based on content included in the NL based input, a set of instructions for a LLM response to be generated in response to receiving the NL based input.

At block 804, the system generates, using an LLM and based on processing the NL based input, LLM output.

At block 806, the system determines, based on the LLM output, a candidate LLM response that is responsive to the NL based input.

At block 808, the system determines whether the candidate LLM response satisfies each of the instructions included in the set of instructions for the LLM response.

In some implementations, to determine whether the candidate LLM response satisfies each of the instructions included in the set of instructions for the LLM response, the system can generate, using the LLM and based on processing the NL based input and the set of instructions, a critique response that indicates whether the candidate LLM response satisfies each of the instructions included in the set of instructions for the LLM response. The system can also determine, based on the critique response, whether the candidate LLM response satisfies each of the instructions included in the set of instructions for the LLM response.

In some implementations, the system can cause the candidate LLM response to be rendered at the client device in response to determining that the candidate LLM response satisfies each of the instructions included in the set of instructions for the LLM response.

At block 810, the system determines that the candidate LLM response does not satisfy each of the instructions included in the set of instructions for the LLM response.

At block 812, and in response to determining that the candidate LLM response fails to satisfy one or more of the instructions included in the set of instructions for the LLM response, the system generates, using the LLM and based on processing at least the one or more instructions that the candidate LLM response fails to satisfy, additional LLM output.

In some implementations, generating the additional LLM output using the LLM is further based on processing the candidate LLM response that failed to satisfy one or more of the instructions included in the set of instructions for the LLM response.

At block 814, the system determines, based on the additional LLM output, an alternative candidate LLM response that is also responsive to the NL based input.

At block 816, the system determines whether the alternative candidate LLM response satisfies each of the instructions included in the set of instructions for the LLM response.

At block 818, and in response to determining that the alternative candidate LLM response satisfies each of the instructions included in the set of instructions for the LLM response, the system causes the alternative candidate LLM response to be rendered at the client device.

In some implementations, the system can determine, based on the LLM output, an additional candidate LLM response that is also responsive to the NL based input. In these implementations, the system can determine whether the additional candidate LLM response satisfies each of the instructions included in the set of instructions for the LLM response. In response to determining that the additional candidate LLM response satisfies each of the instructions included in the set of instructions for the LLM response, the system can refrain from generating the additional LLM output. The system can also cause the additional candidate LLM response to be rendered at the client device and in lieu of the candidate LLM response.

In some of those implementations, generating the additional LLM output is further in response to the system determining that the additional candidate LLM response fails to satisfy one or more of the instructions included in the set of instructions for the LLM response.

In some implementations, prior to determining, based on the NL based input, the set of instructions for the LLM response to be generated in response to receiving the NL based input, the system can determine based on the NL based input whether to proceed with progressive refinement. In these implementations, determining the set of instructions for the LLM response to be generated in response to receiving the NL based input is in response to determining to proceed with progressive refinement.

Although method 800 is generally described in relation to utilizing an NL based response system to generate a response to an NL based input associated with a client device, it will be appreciated that many of the operations of method 800 can also be used in generating training data for fine-tuning an LLM. For instance, rather than the operations described in relation to block 802, the NL based input can be obtained e.g., in the same or similar manner to that described in relation to FIG. 2C, and/or any other manner described herein. Furthermore, rather than the operations described in relation to block 818, the alternative candidate LLM response can be stored, along with the NL based input as an instance of training data for fine-tuning the LLM (e.g., in the same or similar manner to that described in relation to FIG. 2C, and/or any other manner described herein).

Figure 9:
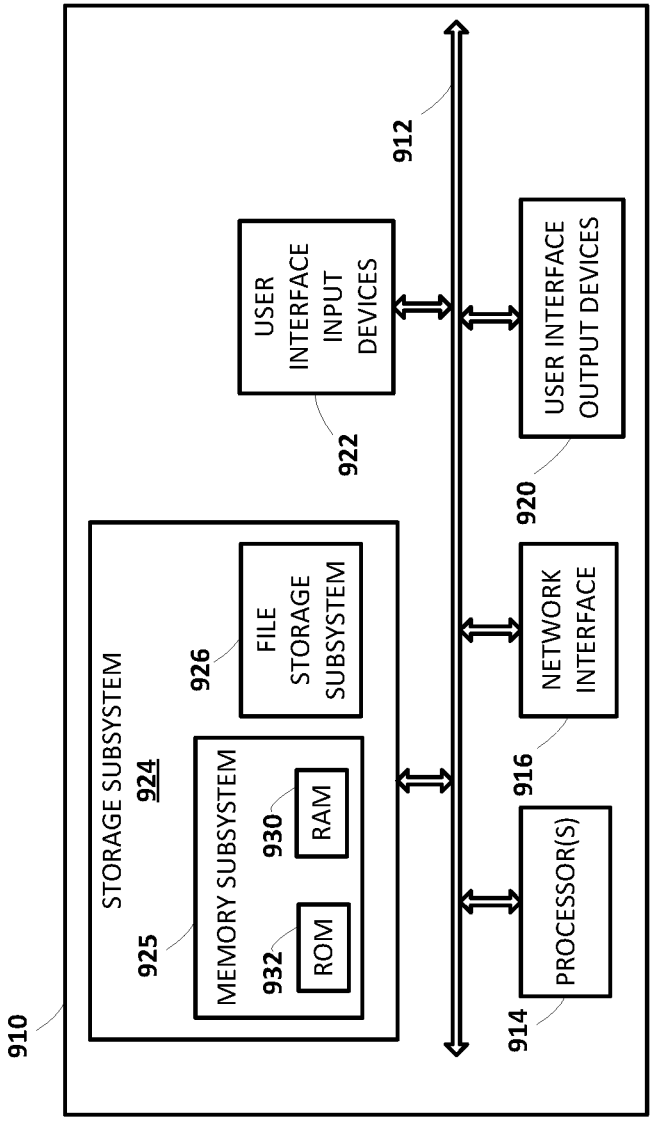
FIG. 9 depicts an example architecture of a computing device, in accordance with various implementations.

Turning now to FIG. 9, a block diagram of an example computing device 910 that may optionally be utilized to perform one or more aspects of techniques described herein is depicted. In some implementations, one or more of a client device, cloud-based automated assistant component(s) or other cloud-based software application component(s), and/or other component(s) can include one or more components of the example computing device 910.

Computing device 910 typically includes at least one processor 914 which communicates with a number of peripheral devices via bus subsystem 912. These peripheral devices can include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 can include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 can include the logic to perform selected aspects of the methods disclosed herein, as well as to implement various components depicted in FIG. 1.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem 912 can use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect or otherwise monitor personal information about users, or can make use of personal and/or monitored information), the users can be provided with an opportunity to control whether programs or features collect user information (e.g., information about a user's social network, social actions or activities, profession, a user's preferences, or a user's current geographic location), or to control whether and/or how to receive content from the content server that can be more relevant to the user. Also, certain data can be treated in one or more ways before it is stored or used, so that personal identifiable information is removed. For example, a user's identity can be treated so that no personal identifiable information can be determined for the user, or a user's geographic location can be generalized where geographic location information is obtained (such as to a city, ZIP code, or state level), so that a particular geographic location of a user cannot be determined. Thus, the user can have control over how information is collected about the user and/or used.

In some implementations, a method implemented by one or more processors is provided and includes: receiving NL based input associated with a client device; generating a plurality of candidate LLM responses based on processing the NL based input using an LLM. The plurality of candidate LLM responses together form a set of candidate LLM responses. The method further includes generating, for each of the plurality of candidate LLM responses, a corresponding critique response, the corresponding critique responses being generated based on processing the plurality of candidate LLM responses using the LLM. Each of the corresponding critique responses includes an indication of the extent to which the corresponding candidate LLM response complies with a set of instructions included in the NL based input. The method further includes determining whether one or more termination criteria are satisfied. When it is determined that the one or more termination criteria are not satisfied, the method further includes progressively refining, until it is determined that the one or more termination criteria are satisfied, the candidate LLM responses based on processing candidate LLM responses from the set of candidate responses using the LLM. When it is determined that the one or more termination criteria are satisfied, the method further includes selecting, based on the corresponding critique response, a candidate LLM response from among the set of candidate responses; and causing the selected candidate LLM response to be rendered at the client device.

These and other implementations of technology disclosed herein can optionally include one or more of the following features.

In some implementations, progressively refining the candidate LLM responses can include: performing repeatedly, until it is determined that the one or more termination criteria are satisfied: selecting a first candidate LLM response from among the set of candidate LLM responses; generating a plurality of refined candidate LLM responses based on processing the first candidate LLM response and the corresponding critique response using the LLM; adding the plurality of refined candidate LLM responses to the set of candidate LLM responses; and generating a corresponding critique response for each of the plurality of refined candidate LLM responses, the corresponding critique responses for each of the plurality of refined candidate LLM responses being generated based on processing the plurality of refined candidate LLM responses using the LLM. Each of the corresponding critique responses for each of the plurality of refined candidate LLM responses can include an indication of the extent to which the corresponding refined candidate LLM response complies with the set of instructions included in the NL based input.

In some versions of those implementations, the indication of the extent to which the corresponding candidate LLM response complies with the set of instructions can be indicative of the instructions of the set of instructions the corresponding LLM response is determined to comply with.

In additional or alternative versions of those implementations, the first candidate LLM response can be selected from among the set of candidate LLM responses based on: determining that the first candidate LLM response best complies with the set of instructions from among the set of candidate LLM responses; and determining that the first candidate LLM response has not been selected as the first candidate LLM response previously.

In additional or alternative versions of those implementations, the first candidate LLM response can be selected from among the set of candidate LLM responses based on searching a priority queue. The priority queue can include the set of candidate LLM responses, and each of the set of candidate LLM responses in the priority queue can be associated with a priority based on the corresponding critique response.

In some implementations, the one or more termination criteria can include one or more of: a threshold number of repetitions, a threshold execution time, a threshold number of processor cycles, and a threshold memory utilization. When the one or more termination criteria are satisfied, the selected candidate LLM response can be selected based on determining that the selected candidate LLM response best complies with the set of instructions from among the set of candidate LLM responses.

In additional or alternative versions of those implementations, the one or more termination criteria can include a threshold extent to which a given candidate LLM from the set of candidate LLM responses complies with the set of instructions. When it is determined, based on the corresponding critique response, that the extent to which a particular candidate LLM from the set of candidate LLM responses complies with the set of instructions exceeds the threshold extent, the particular LLM candidate response can be selected as the selected candidate LLM response.

In some implementations, generating the corresponding critique responses corresponding for each of the candidate LLM responses can include: generating a request for the LLM to identify a set of instructions included in the NL based input and to determine the extent to which each of the candidate LLM responses complies with the set of instructions; and processing the request and the NL based input using the LLM to identify the set of instructions included in the NL based input and to generate the corresponding critique responses.

In some implementations, generating the plurality of refined candidate LLM responses can include: generating a request for the LLM to refine the first candidate LLM response based on the corresponding critique response. The request for the LLM to refine the first candidate LLM response can include an indication of the instructions of the set of instructions that the first candidate LLM response was determined to violate based on the corresponding critique response; and the method can further include processing the request using the LLM to generate the plurality of refined LLM responses.

In some implementations, the method can further include: determining whether to proceed with progressive refinement based on one or both of: contextual data associated with the client device and/or a user of the client device, and the NL based input.

In some implementations, a method implemented by one or more processors is provided and includes: obtaining NL based input; generating a plurality of candidate LLM responses based on processing the NL based input using an LLM. The plurality of candidate LLM responses together form a set of candidate LLM responses. The method can further include generating, for each of the plurality of candidate LLM responses, a corresponding critique response, the corresponding critique responses being generated based on processing the plurality of candidate LLM responses using the LLM. Each of the corresponding critique responses includes an indication of the extent to which the corresponding candidate LLM response complies with a set of instructions included in the NL based input. The method further includes determining whether one or more termination criteria are satisfied. When it is determined that the one or more termination criteria are not satisfied, the method further includes: progressively refining, until it is determined that the one or more termination criteria are satisfied, the candidate LLM responses based on processing candidate LLM responses from the set of candidate responses using the LLM. When it is determined that the one or more termination criteria are satisfied, the method further includes: selecting, based on the corresponding critique response, a candidate LLM response from among the set of candidate responses; and storing, as an instance of training data for fine-tuning a LLM, the NL based input along with the selected candidate LLM response.

These and other implementations of technology disclosed herein can optionally include one or more of the following features.

In some implementations, the indication of the extent to which the corresponding candidate LLM response complies with the set of instructions can be indicative of the instructions of the set of instructions the corresponding LLM response is determined to comply with.

In some additional or alternative implementations, progressively refining the candidate LLM responses can include: performing repeatedly, until it is determined that the one or more termination criteria are satisfied: selecting a first candidate LLM response from among the set of candidate LLM responses; generating a plurality of refined candidate LLM responses based on processing the first candidate LLM response and the corresponding critique response using the LLM; adding the plurality of refined candidate LLM responses to the set of candidate LLM responses; and generating a corresponding critique response for each of the plurality of refined candidate LLM responses, the corresponding critique responses for each of the plurality of refined candidate LLM responses being generated based on processing the plurality of refined candidate LLM responses using the LLM. Each of the corresponding critique responses for each of the plurality of refined candidate LLM responses can include an indication of the extent to which the corresponding refined candidate LLM response complies with the set of instructions included in the NL based input.

In some implementations, the first candidate LLM response can be selected from among the set of candidate LLM responses based on: determining that the first candidate LLM response best complies with the set of instructions from among the set of candidate LLM responses; and determining that the first candidate LLM response has not been selected as the first candidate LLM response previously.

In some versions of those implementations, the first candidate LLM response can be selected from among the set of candidate LLM responses based on searching a priority queue. The priority queue can include the set of candidate LLM responses, and each of the set of candidate LLM responses in the priority queue can be associated with a priority based on the corresponding critique response.

In some implementations, the one or more termination criteria can include one or more of: a threshold number of repetitions, a threshold execution time, a threshold number of processor cycles, and a threshold memory utilization. When the one or more termination criteria are satisfied, the selected candidate LLM response can be selected based on determining that the selected candidate LLM response best complies with the set of instructions from among the set of candidate LLM responses.

In some additional or alternative implementations, the one or more termination criteria can include a threshold extent to which a given candidate LLM from the set of candidate LLM responses complies with the set of instructions. When it is determined, based on the corresponding critique response, that the extent to which a particular candidate LLM from the set of candidate LLM responses complies with the set of instructions exceeds the threshold extent, the particular LLM candidate response can be selected as the selected candidate LLM response.

In some implementations, generating the critique responses corresponding to the set of candidate LLM responses can include: generating a request for the LLM to identify a set of instructions included in the NL based input and to determine the extent to which each of the candidate LLM responses complies with the set of instructions; and processing the request and the NL based input using the LLM to identify the set of instructions included in the NL based input and to generate the corresponding critique responses.

In some implementations, generating the plurality of refined candidate LLM responses can include: generating a request for the LLM to refine the first candidate LLM response based on the corresponding critique response. The request for the LLM to refine the first candidate LLM response can include an indication of the instructions of the set of instructions that the first candidate LLM response was determined to violate based on the corresponding critique response; and the method can further include processing the request using the LLM to generate the plurality of refined LLM responses.

In some implementations, obtaining the NL based input can include identifying a particular NL based input from one or more databases based on: obtaining the particular NL based input and the LLM response; generating a corresponding critique response based on processing the LLM response using the LLM. The corresponding critique responses can include an indication that the LLM response violates at least one of the set of instructions included in the particular NL based input.

In some implementations, the method can further include: fine-tuning the LLM based on the training data.

In some versions of those implementations, the method can further include: subsequent to fine-tuning the LLM, receiving an NL based input associated with a client device; generating an LLM response based on processing the NL based input associated with the client device using the fine-tuned LLM; and causing the LLM response to be rendered at the client device.

In some implementations, a method implemented by one or more processors is provided, and includes obtaining NL based input; obtaining a LLM response which has been generated based on processing the NL based input using an LLM; generating a critique response for the LLM response, the critique response for the LLM response being generated based on processing the LLM response using the LLM. The NL based input includes a first set of instructions, and the critique response includes an indication of at least one instruction of the first set of instructions which the LLM response is determined to violate. The method further includes modifying the NL based input such that the modified NL based input includes a second set of instructions. The LLM response does comply with each instruction in the second set of instructions. The method further includes storing the modified NL based input and the LLM response as an instance of training data.

These and other implementations of technology disclosed herein can optionally include one or more of the following features.

In some implementations, the method can further include: prior to storing the modified NL based input and the LLM response as an instance of training data: generating an additional critique response for the LLM response, the additional critique response for the LLM response being generated based on processing the LLM response using the LLM. The additional critique response can include an indication that the LLM response complies with each of the instructions of the second set of instructions included in the modified NL based input. The method can further include verifying the modified NL based input based on the indication; and determining to store the modified NL based input and the LLM response as an instance of training data based on the verifying.

In some implementations, the at least one instruction of the first set of instructions can include a first requirement for the LLM response to include a first threshold number of characters, sentences, lines, and/or paragraphs. The LLM response does not comply with the first requirement, and the second set of instructions can include a second requirement for the LLM response to include a second threshold number of characters, sentences, lines, and/or paragraphs, and the LLM response does comply with the second requirement.

In some implementations, a method implemented by one or more processors is provided, and includes: obtaining NL based input; obtaining a LLM response which has been generated based on processing the NL based input using an LLM; generating a critique response for the LLM response, the critique response for the LLM response being generated based on processing the LLM response using the LLM, the NL based input including a set of instructions, and the critique response includes an indication of at least one instruction of the set of instructions which the LLM response is determined to violate. The method further includes modifying the LLM response such that the modified LLM response complies with the at least one instruction; and storing the NL based input and the modified LLM response as an instance of training data.

These and other implementations of technology disclosed herein can optionally include one or more of the following features.

In some implementations, the method can further include: prior to storing the NL based input and the modified LLM response as an instance of training data: generating an additional critique response for the modified LLM response, the additional critique response for the modified LLM response can be generated based on processing the modified LLM response using the LLM, the additional critique response can include an indication that the modified LLM response complies with at least one instruction. The method can further include verifying the modified NL based input based on the indication; and determining to store the NL based input and the modified LLM response as an instance of training data based on the verifying.

In some implementations, the at least one instruction can include a requirement for the LLM response to include a maximum number of characters, sentences, lines, and/or paragraphs. The LLM response does not comply with the first requirement, and modifying the LLM response can include deleting at least some of the LLM response such that the modified LLM response does comply with the requirement.

In some implementations, a method implemented by one or more processors is provided and includes: receiving NL based input associated with a client device; determining, based on content included in the NL based input, a set of instructions for a LLM response to be generated in response to receiving the NL based input; generating, using an LLM and based on processing the NL based input, LLM output; determining, based on the LLM output, a candidate LLM response that is responsive to the NL based input; determining whether the candidate LLM response satisfies each of the instructions included in the set of instructions for the LLM response; in response to determining that the candidate LLM response fails to satisfy one or more of the instructions included in the set of instructions for the LLM response: generating, using the LLM and based on processing at least the one or more instructions that the candidate LLM response fails to satisfy, additional LLM output; and determining, based on the additional LLM output, an alternative candidate LLM response that is also responsive to the NL based input; determining whether the alternative candidate LLM response satisfies each of the instructions included in the set of instructions for the LLM response; and in response to determining that the alternative candidate LLM response satisfies each of the instructions included in the set of instructions for the LLM response: causing the alternative candidate LLM response to be rendered at the client device.

These and other implementations of technology disclosed herein can optionally include one or more of the following features.

In some implementations, determining whether the candidate LLM response satisfies each of the instructions included in the set of instructions for the LLM response can include: generating, using the LLM and based on processing the NL based input and the set of instructions, a critique response that indicates whether the candidate LLM response satisfies each of the instructions included in the set of instructions for the LLM response; and determining, based on the critique response, whether the candidate LLM response satisfies each of the instructions included in the set of instructions for the LLM response.

In some implementations, the method can further include: determining, based on the LLM output, an additional candidate LLM response that is also responsive to the NL based input; determining whether the additional candidate LLM response satisfies each of the instructions included in the set of instructions for the LLM response; and in response to determining that the additional candidate LLM response satisfies each of the instructions included in the set of instructions for the LLM response: refraining from generating the additional LLM output; and causing the additional candidate LLM response to be rendered at the client device and in lieu of the candidate LLM response.

In some versions of those implementations, generating the additional LLM output can be further in response to determining that the additional candidate LLM response fails to satisfy one or more of the instructions included in the set of instructions for the LLM response.

In some implementations, the method can further include: prior to determining, based on the NL based input, the set of instructions for the LLM response to be generated in response to receiving the NL based input: determining, based on the NL based input, whether to proceed with progressive refinement, and determining the set of instructions for the LLM response to be generated in response to receiving the NL based input can be in response to determining to proceed with progressive refinement.

In some implementations, generating, the additional LLM output using the LLM is further based on processing the candidate LLM response that failed to satisfy one or more of the instructions included in the set of instructions for the LLM response.

In some implementations, the method can further include: in response to determining that the candidate LLM response satisfies each of the instructions included in the set of instructions for the LLM response: causing the candidate LLM response to be rendered at the client device.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more computer readable storage media (e.g., transitory and/or non-transitory) storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   fine-tuning, based on a plurality of training instances, a large language model (LLM); and
   causing the LLM to be deployed, wherein causing the LLM to be deployed comprises:
   receiving natural language (NL) based input associated with a client device, the NL based input including a set of instructions provided by a user of the client device;
   generating a plurality of candidate LLM responses based on processing the NL based input using the LLM, wherein the plurality of candidate LLM responses together form a set of candidate LLM responses;
   generating, for each of the plurality of candidate LLM responses, a corresponding critique response, the corresponding critique responses being generated based on processing, using the LLM, the plurality of candidate LLM responses and the set of instructions included in the NL based input;
   determining, based on each of the corresponding critique responses, an indication of an extent to which the corresponding candidate LLM response complies with the set of instructions included in the NL based input, wherein the indication of the extent to which the corresponding candidate LLM response complies with the set of instructions is indicative of the instructions of the set of instructions the corresponding candidate LLM response is determined to comply with; and in response to determining that a given candidate LLM response, from among the set of candidate LLM responses, complies with at least a threshold number of instructions of the set of instructions based on the corresponding critique responses:

selecting the given candidate LLM response from among the set of candidate LLM responses; and causing the given candidate LLM response to be rendered at the client device.

2. The method of claim 1, further comprising:

progressively refining the candidate LLM responses until the given candidate LLM response complies with each instruction of the set of instructions included in the NL based input.

3. The method of claim 1, wherein the given candidate LLM response is selected from among the set of candidate LLM responses based on determining that the given candidate LLM response best complies with the set of instructions from among the set of candidate LLM responses.

4. The method of claim 1, wherein the given candidate LLM response is selected from among the set of candidate LLM responses based on searching a priority queue, wherein the priority queue comprises the set of candidate LLM responses, and wherein each of the set of candidate LLM responses in the priority queue is associated with a priority based on the corresponding critique response.

5. The method of claim 1, further comprising:

progressively refining the candidate LLM responses until one or more termination criteria are satisfied, wherein the one or more termination criteria comprises one or more of: a threshold number of repetitions, a threshold execution time, a threshold number of processor cycles, or a threshold memory utilization, and wherein, when the one or more termination criteria are satisfied, the given candidate LLM response is selected based on determining that the given candidate LLM response best complies with the set of instructions from among the set of candidate LLM responses.

6. The method of claim 1, further comprising:

progressively refining the candidate LLM responses until one or more termination criteria are satisfied, wherein the one or more termination criteria comprises the threshold number of instructions of the set of instructions, and wherein, when the one or more termination criteria are satisfied, the given candidate LLM response is selected based on determining that the given candidate LLM response best complies with the set of instructions from among the set of candidate LLM responses.

7. The method of claim 1, further comprising:

generating a plurality of refined candidate LLM responses, wherein generating the plurality of refined candidate LLM responses comprises:

generating a request for the LLM to refine a first candidate LLM response based on the corresponding critique response, wherein the request for the LLM to refine the first candidate LLM response comprises the indication of the instructions of the set of instructions that the first candidate LLM response was determined to violate based on the corresponding critique response; and processing the request using the LLM to generate the plurality of refined LLM responses.

8. The method of claim 1, wherein generating the corresponding critique response for each of the plurality of candidate LLM responses comprises:

generating a request for the LLM to identify the set of instructions included in the NL based input and to determine the extent to which each of the candidate LLM responses complies with the set of instructions; and processing the request and the NL based input using the LLM to identify the set of instructions included in the NL based input and to generate the corresponding critique responses.

9. The method of claim 1, further comprising:

determining whether to proceed with progressive refinement based on one or both of:

contextual data associated with the client device and/or the user of the client device, and the NL based input.

10. A method implemented by one or more processors, the method comprising:

fine-tuning, based on a plurality of training instances, a large language model (LLM); and causing the LLM to be deployed, wherein causing the LLM to be deployed comprises:

obtaining natural language (NL) based input, the NL based input including a set of instructions provided by a user of a client device;

generating a plurality of candidate LLM responses based on processing the NL based input using the LLM, wherein the plurality of candidate LLM responses together form a set of candidate LLM responses;

generating, for each of the plurality of candidate LLM responses, a corresponding critique response, the corresponding critique responses being generated based on processing, using the LLM, the plurality of candidate LLM responses and the set of instructions included in the NL based input;

determining, based on each of the corresponding critique responses, an indication of an extent to which the corresponding candidate LLM response complies with the set of instructions included in the NL based input, wherein the indication of the extent to which the corresponding candidate LLM response complies with the set of instructions is indicative of the instructions of the set of instructions the corresponding candidate LLM response is determined to comply with; and in response to determining that a given candidate LLM response, from among the set of candidate LLM responses, complies with at least a threshold number of instructions of the set of instructions based on the corresponding critique responses:

selecting the given candidate LLM response from among the set of candidate LLM responses; and storing, as an additional training instance for further fine-tuning the LLM, the NL based input along with the given candidate LLM response.

11. The method of claim 10, further comprising:

progressively refining the candidate LLM responses until the given candidate LLM response complies with each instruction of the set of instructions included in the NL based input.

12. The method of claim 10, wherein the given candidate LLM response is selected from among the set of candidate LLM responses based on determining that the given candidate LLM response best complies with the set of instructions from among the set of candidate LLM responses.

13. The method of claim 10, wherein the given candidate LLM response is selected from among the set of candidate LLM responses based on searching a priority queue, wherein the priority queue comprises the set of candidate LLM responses, and wherein each of the set of candidate LLM responses in the priority queue is associated with a priority based on the corresponding critique response.

14. The method of claim 10, further comprising:

progressively refining the candidate LLM responses until one or more termination criteria are satisfied, wherein the one or more termination criteria comprises one or more of: a threshold number of repetitions, a threshold execution time, a threshold number of processor cycles, or a threshold memory utilization, and wherein, when the one or more termination criteria are satisfied, the given candidate LLM response is selected based on determining that the given candidate LLM response best complies with the set of instructions from among the set of candidate LLM responses.

15. The method of claim 10, further comprising:

progressively refining the candidate LLM responses until one or more termination criteria are satisfied, wherein the one or more termination criteria comprises the threshold number of instructions of the set of instructions, and wherein, when the one or more termination criteria are satisfied, the given candidate LLM response is selected based on determining that the given candidate LLM response best complies with the set of instructions from among the set of candidate LLM responses.

16. The method of claim 10, further comprising:

generating a plurality of refined candidate LLM responses, wherein generating the plurality of refined candidate LLM responses comprises:

generating a request for the LLM to refine a first candidate LLM response based on the corresponding critique response, wherein the request for the LLM to refine the first candidate LLM response comprises the indication of the instructions of the set of instructions that the first candidate LLM response was determined to violate based on the corresponding critique response; and processing the request using the LLM to generate the plurality of refined LLM responses.

17. The method of claim 10, wherein generating the corresponding critique response for each of the plurality of candidate LLM responses comprises:

generating a request for the LLM to identify the set of instructions included in the NL based input and to determine the extent to which each of the candidate LLM responses complies with the set of instructions; and processing the request and the NL based input using the LLM to identify the set of instructions included in the NL based input and to generate the corresponding critique responses.

18. A system comprising:

at least one processor; and memory storing instructions that, when executed, cause the at least one processor to be operable to:

fine-tune, based on a plurality of training instances, a large language model (LLM); and cause the LLM to be deployed, wherein the instructions to cause the LLM to be deployed comprise instructions to:

receive natural language (NL) based input associated with a client device, the NL based input including a set of instructions provided by a user of the client device;

generate a plurality of candidate LLM responses based on processing the NL based input using the LLM, wherein the plurality of candidate LLM responses together form a set of candidate LLM responses;

generate, for each of the plurality of candidate LLM responses, a corresponding critique response, the corresponding critique responses being generated based on processing, using the LLM, the plurality of candidate LLM responses and the set of instructions included in the NL based input;

determine, based on each of the corresponding critique responses, an indication of an extent to which the corresponding candidate LLM response complies with the set of instructions included in the NL based input, wherein the indication of the extent to which the corresponding candidate LLM response complies with the set of instructions is indicative of the instructions of the set of instructions the corresponding candidate LLM response is determined to comply with; and in response to determining that a given candidate LLM response, from among the set of candidate LLM responses, complies with at least a threshold number of instructions of the set of instructions based on the corresponding critique responses:

select the given candidate LLM response from among the set of candidate LLM responses; and cause the given candidate LLM response to be rendered at the client device.

19. The system of claim 18, wherein the instructions further cause the at least one processor to be operable to:

progressively refine the candidate LLM responses until the given candidate LLM response complies with each instruction of the set of instructions included in the NL based input.

20. The system of claim 18, wherein the given candidate LLM response is selected from among the set of candidate LLM responses based on determining that the given candidate LLM response best complies with the set of instructions from among the set of candidate LLM responses.

* * * * *